(12) United States Patent
Stein et al.

(10) Patent No.: US 7,813,881 B2
(45) Date of Patent: Oct. 12, 2010

(54) QUANTITATIVE ASSESSMENT OF BIOLOGICAL FUNCTION BASED ON THE TEMPORAL AND SPATIAL ORGANIZATION OF SUBNUCLEAR DOMAINS

(75) Inventors: Gary S. Stein, Shrewsbury, MA (US); Daniel W. Young, Sutton, MA (US); Sayyed K. Zaidi, Worcester, MA (US); Amjad Javed, Hoover, AL (US); Andre J. Van Wijnen, Auburn, MA (US); Janet L. Stein, Shrewsbury, MA (US); Jane B. Lian, Westborough, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 11/221,166

(22) Filed: Sep. 7, 2005

(65) Prior Publication Data

US 2006/0149481 A1 Jul. 6, 2006

Related U.S. Application Data

(60) Provisional application No. 60/608,846, filed on Sep. 10, 2004.

(51) Int. Cl.
*G01N 33/483* (2006.01)
(52) U.S. Cl. .................................. 702/19; 382/133
(58) Field of Classification Search ................ None
See application file for complete search history.

(56) References Cited

U.S. PATENT DOCUMENTS

| 5,048,095 | A * | 9/1991 | Bhanu et al. ................. 706/13 |
| 2003/0023385 | A1 * | 1/2003 | Lazaridis ..................... 702/19 |
| 2003/0027159 | A1 * | 2/2003 | Ward et al. ..................... 435/6 |
| 2003/0139886 | A1 * | 7/2003 | Bodzin et al. ................ 702/28 |

OTHER PUBLICATIONS

Hazzouri et al (Molecular reproduction and development, vol. 55, p. 307-315, 2000).*
Kahn et al (Cytometry, vol. 28, p. 269-279, 1997).*
Armstrong (Journal of Neuroscience Methods, vol. 73, p. 141-147, 1997).*
Theilmann et al. (J Cancer Res Clin Oncol, vol. 125, p. 193-208, 1999).*
Traniello et al. (Oecologia, vol. 69, p. 413-419, 1986).*
Weyn et al. (J. Pathol. 189: 581-589, 1999).*
Jain et al. (IEEE Transactions on Pattern Analysis and Machine Intelligence, vol. 22, No. 1, Jan. 2000).*
Stenoien, D.L. et al., Ligand-mediated assembly and real-time cellular dynamics of estrogen receptor alpha-coactivator complexes in living cells. Mol Cell Biol. Jul. 2001; 21 (13): 4404-4412.
Tanabe, H., et al., Non-random radial arrangements of interphase chromosome territories: evolutionary considerations and functional implications. Mutat Res. Jul. 25, 2002; 504 (1-2): 37-45.

Zhang, Y.W., et al., PEBP2alphaA/CBFA1 mutations in Japanese cleidocranial dysplasia patients. Gene. Feb. 22, 2000; 244 (1-2): 21-8.
Bolzer et al., "Three-dimensional maps of all chromosomes in human male fibroblast nuclei and prometaphase rosettes", PLoS Biology. 2005, 3 (5):0826-0842.
Bradbury, J. In This Issue: Intranuclear Informatics. Journal of Cell Science 117, 2102e (2004).
Young D.W. et al., "Quantitative signature for architectural organization of regulatory factors using intranuclear informatics", J Cell Science. 2004(Pt 21):4889-96.
Aranda, A., et al., Nuclear Hormone Receptors and Gene Expression. Physiological Reviews. Jul. 2001; vol. 81, No. 2: 1269-1304.
Barseguian K, et al., Multiple subnuclear targeting signals of the leukemia-related AML1/ETO and ETO repressor proteins, Proc Natl Acad Sci U S A. Nov. 26, 2002; 99(24):15434-9. Epub Nov. 11, 2002.
Boland, MV, et al., Automated Recognition of Patterns Characteristic of Subcellular Structures in Fluorescence Microscopy Images. Cytometry 33: 366-375 (1998).
Bolivar, J., et al., The fragile-X-related gene FXR1 is a human autoantigen processed during apoptosis. J Biol Chem. Jul. 3, 1998; 273(27):17122-7.
Carrington, W.A. et al. Science 268, 1483-1487 (1995).
Chai, Z., et al., SET-related cell division autoantigen-1 (CDA1) arrests cell growth. J Biol Chem. Sep. 7, 2001;276 (36):33665-74. Epub Jun. 6, 2001.
Choi, J.-Y. et al. Subnuclear targeting of Runx/Cbfa/AML factors is essential for tissue-specific differentiation during embryonic development, Proc. Natl. Acad. Sci., USA 98, 8650-8655 (2001).
Dundr, M. & Misteli, T., Functional architecture in the cell nucleus, Biochem J 356, 297-310 (2001).
Dyck, J.A,, et al., Rapid diagnosis of acute promyelocytic leukemia by immunohistochemical localization of PML/ RAR-alpha protein, Blood. 1995 86(3):862-867.
Eils, R., et al., Quantitative Imaging of Pre-mRNA Splicing Factors in Living Cells. The American Society for Cell Biology. Feb. 2000; vol. 11: 413-418.

(Continued)

*Primary Examiner*—Karlheinz R Skowronek
(74) *Attorney, Agent, or Firm*—Wolf, Greenfield & Sacks, P.C.

(57) ABSTRACT

The present invention provides a method useful for analysis of punctate distribution of supramolecular complexes that are compartmentalized in nuclear microenvironments. In preferred embodiments the method provides quantitative analysis of the assembly of regulatory machinery within the context of nuclear architecture and to provide a mechanistic link with biological control. In other embodiments, the invention provides a method of identifying a molecule by parameters of its subnuclear distribution, comprising the steps of quantifying organizational parameters of domains within subnuclear distributions of a molecule; performing factor analysis on the quantified organizational parameters; performing discriminant analysis on the quantified organizational parameters; comparing the results of the factor analysis and the results of the discriminant analysis to one or more standards, thereby identifying a molecule by parameters of its subnuclear distribution.

23 Claims, 19 Drawing Sheets

OTHER PUBLICATIONS

Guo et al., The nuclear matrix protein NMP-1 is the transcription factor YY1, Proc. Natl. Acad. Sci.USA 1995 92, 10526-10530.

Harrington, K.S. et al. Transcription factors RUNX1/AML1 and RUNX2/Cbfa1 dynamically associate with stationary subnuclear domains, J. Cell Sci. 115, 4167-4176 (2002).

Javed et al., Groucho/TLE/R-esp proteins associate with the nuclear matrix and repress RUNX (CBF(alpha)/AML/PEBP2(alpha)) dependent activation of tissue-specific gene transcription, J. Cell Sci. 2000 113, 2221-2231.

Karpuj, M.V., et al., Transglutaminase aggregates huntingtin into nonamyloidogenic polymers, and its enzymatic activity increases in Huntington's disease brain nuclei, Proc Natl Acad Sci U S A. Jun. 22, 1999;96(13):7388-7393.

Lemon, B. & Tjian, R., Orchestrated response: a symphony of transcription factors for gene control, Genes Dev. 14, 2551-2569 (2000).

Llopis, J., et al., Ligand-dependent interactions of coactivators steriod receptor coactivator-1 and peroxisome proliferator-activated receptor binding protein with nuclear hormone receptors can be imaged in live cells and are required for transcription. Proceedings of the National Academy of Sciences. Apr. 11, 2000; vol. 97, No. 8: 4363-4368.

Ma, H. et al., Spatial and temporal dynamics of DNA replication sites in mammalian cells, J. Cell Biol. 143, 1415-1425 (1998).

McNeil, S., et al., The t(8;21) chromosomal translocation in acute myelogenous leukemia modifies intranuclear targeting of the AML1/CBFalpha2 transcription factor, Proc Natl Acad Sci U S A. 1999;96(26):14882-7.

Mosgoeller, W., et al, Nuclear architecture and ultrastructural distribution of poly(ADP-ribosyl)transferase, a multifunctional enzyme. J Cell Sci. Feb. 1996;109 ( Pt 2):409-18.

Nielsen, J.A., et al., Nuclear organization in differentiating oligodendrocytes, J Cell Sci. 115, 4071-4079 (2002).

Noordmans, H.J., et al.,. Randomness of spatial distributions of two proteins in the cell nucleus involved in mRNA synthesis and their relationship, Cytometry 33, 297-309 (1998).

Pearce, D., et al., Determinants of subnuclear organization of mineralocorticoid receptor characterized through analysis of wild type and mutant receptors. The Journal of Biological Chemistry; vol. 277, No. 2: 1451-1456, 2002.

Price, R., et al., A splice variant of estrogen receptor β missing exon 3 displays altered subnuclear localization and capacity for transcriptional activation. The Endocrine Society. 2001; vol. 142, No. 5: 2039-2049.

Reyes et al., Components of the human SWI/SNF complex are enriched in active chromatin and are associated with the nuclear matrix, J. Cell Biol. 1997 137, 263-274.

Shiels, C. et al., PML bodies associate specifically with the MHC gene cluster in interphase nuclei, J Cell Sci. 114, 3705-3716 (2001).

Stein, G.S., et al., Cancer Res. 60, 2067-2076 (2000).

Stein, G.S. et al., Intranuclear trafficking of transcription factors: implications for biological control., J. Cell Sci. 113, 2527-2533 (2000).

Szentirmay, M., et al., Spatial organization of RNA polymerase II transcription in the nucleus. Oxford University Press, Nucleic Acids Research. 2000; vol. 28, No. 10: 2019-2025.

Tang, L. et al. Crystal structure of the nuclear matrix targeting signal of the transcription factor AML-1/PEBP2aB/CBFa2. J. Biol. Chem. 274, 33580-33586 (1999).

Westendorf, J.J. et al., Runx2 (Cbfa1, AML-3) interacts with histone deacetylase 6 and represses the p21(CIP1/ WAF1) promoter, Mol. Cell Biol. 22, 7982-7992 (2002).

Zaidi, S.K., et al., A specific targeting signal directs Runx2/Cbfa1 to subnuclear domains and contributes to transactivation of the osteocalcin gene., J. Cell Sci. 2001 114, 3093-3102.

Zaidi, S.K. et al. Integration of Runx and Smad regulatory signals at transcriptionally active subnuclear sites, Proc. Natl. Acad. Sci., USA 99, 8048-8053 (2002).

Zaidi, S.K. et al., Proc. Natl. Acad. Sci. USA 100, 14852-14855 (2003).

Zeng, C. et al., Identification of a nuclear matrix targeting signal in the leukemia and bone-related AML/CBF-alpha transcription factors, Proc. Natl. Acad. Sci. USA 94, 6746-6751 (1997).

Zeng, C., et al., Intranuclea targeting of AML/CBFα regulatory factors to nuclear matrix-associated transcriptional domains. Proc. Natl. Acad. Sci. Feb. 1998; vol. 95: 1585-1589.

* cited by examiner

RUNX1
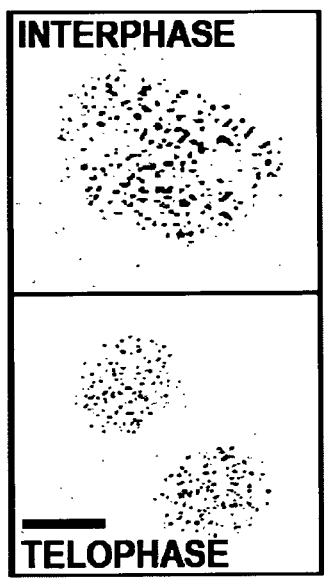
Figure 6A
Figure 6B
RUNX2
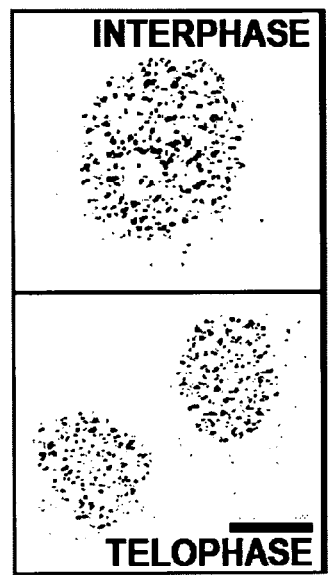
Figure 6C
Figure 6D

QUANTITATIVE ASSESSMENT OF BIOLOGICAL FUNCTION BASED ON THE TEMPORAL AND SPATIAL ORGANIZATION OF SUBNUCLEAR DOMAINS

RELATED APPLICATIONS

This application claims benefit of U.S. Provisional Patent Application 60/608,846 filed Sep. 10, 2004, the entire contents of which are incorporated by reference for all purposes.

GOVERNMENT SUPPORT

This invention was supported, in whole or in part, by grants P01CA82834, PO1AR48818, and AR39588 from the National Institutes of Health. The United States government has certain rights in the invention.

BACKGROUND OF THE INVENTION

The architectural organization of nucleic acids and cognate factors in subnuclear microenvironments is linked with gene regulation, replication and repair (Stein, G. S., et al., Cancer Res. 60, 2067-2076 (2000); Stein, G. S. et al., J. Cell Sci. 113, 2527-2533 (2000); Lemon, B. & Tjian, R., Genes Dev. 14, 2551-2569 (2000); Dundr, M. & Misteli, T., Biochem J 356, 297-310 (2001); Iborra, F. J. & Cook, P. R., Curr. Opin. Cell Biol. 14, 780-785 (2002); Spector, D. L., Annu. Rev. Biochem 72, 573-608 (2003); and Stein, G. S. et al., Trends Cell Biol. 13, 584-592 (2003)). Spatio-temporal changes in this subnuclear organization accompany cell cycle progression and cell differentiation (Ma, H. et al., J. Cell Biol. 143, 1415-1425 (1998) and Francastel, C., et al., Nat. Rev. Mol Cell Biol. 1, 137-143 (2000)). Perturbations in subnuclear organization have been functionally related with compromised gene expression that accompanies the onset and progression of disease. See Dyck, J. A, et al., Rapid diagnosis of acute promyelocytic leukemia by immunohistochemical localization of PML/RAR-alpha protein, Blood. 1995 86(3):862-867; Karpuj, M. V., et al., Transglutaminase aggregates huntingtin into nonamyloidogenic polymers, and its enzymatic activity increases in Huntington's disease brain nuclei, Proc Natl Acad Sci USA. 1999 Jun. 22; 96(13):7388-7393; McNeil, S., et al., The t(8;21) chromosomal translocation in acute myelogenous leukemia modifies intranuclear targeting of the AML1/CBFalpha2 transcription factor, Proc Natl Acad Sci USA. 1999;96(26):14882-7.

Biological control of gene expression has previously been studied by the identification and characterization of promoter elements and their cognate regulatory and co-regulatory proteins, as well as by mechanistically defining the dynamics of chromatin structure and nucleosome organization. Results of such studies have shown that regulatory parameters of gene expression are operative within a higher-order subnuclear organization of nucleic acids and regulatory proteins. Observations made by epifluorescence and confocal microscopy have provided the initial insight into assembly of nuclear microenvironments that support the combinatorial compartmentalization of regulatory factors and chromosomal domains. Quantitative methods are needed to mechanistically associate the subnuclear organization of regulatory factors with biological control.

SUMMARY OF THE INVENTION

The present invention provides a method, termed intranuclear informatics that is useful for examining the subnuclear organization of regulatory factor domains from digital microscopic images. Intranuclear informatics utilizes parameters with biologically relevant variability to characterize subnuclear organization. In preferred embodiments, the present invention provides a method of processing images to acquire and evaluate parameters of subnuclear organization.

In preferred embodiments the method includes the steps of performing in situ immunofluorescence and microscopy, acquiring at least one digital image, identifying subnuclear domains by image segmentation of the digital image, computing subnuclear organization parameters and performing statistical analysis of the subnuclear organization parameters. In preferred embodiments, the step of acquiring digital images further includes the steps of deconvoluting the digital image. In preferred embodiments. the step of defining subnuclear domains by image segmentation further comprises the steps of providing a fluorescence photomicrographic image and a nuclear mask image, producing a masked image, determining an image threshold, performing image segmentation and defining subnuclear domains.

In preferred embodiments, the present invention provides a method for quantifying domains within a punctate distribution comprising the steps of acquiring at least one digital image of a punctate distribution; identifying domains within the punctate distribution by image segmentation of the digital image; computing organizational parameters and performing statistical analysis of the organizational parameters. Typically, the step of acquiring digital images further comprises the steps of deconvoluting the digital image, and providing a mask of a portion of the digital image. Typically, at least one digital image is a fluorescence photomicrographic image of the nucleus of a eukaryotic cell.

In preferred embodiments, the step of identifying domains further comprises the steps of providing a mask of a portion of the digital image, producing a masked image, determining an image threshold, performing image segmentation and defining domains. Typically, the organizational parameters include at least two of the following: the number of domains, mean domain size, median domain size, standard deviation of domain size, variance of domain size, skewness of domain size, kurtosis of domain size, coefficient of variation of domain size; index of dispersion of domain size; mean nearest neighbor distance, median nearest neighbor distance, standard deviation of nearest neighbor distance, variance of nearest neighbor distance, skewness of nearest neighbor distance, kurtosis of nearest neighbor distance, coefficient of variation of nearest neighbor distance; index of dispersion of nearest neighbor distance, domain density, Re, Ro/Re, Ve, Vo/Ve, Rp, Rd, or Rd/Rp. Typically, factor analysis is performed on the organizational parameters.

In other preferred embodiments, the present invention provides a method of determining temporal changes in subnuclear organization of regulatory proteins before and after an event, typically an event of biological significance. In a preferred embodiment, the event is mitosis.

In other preferred embodiments, the methods of the present invention can be used to identify dysfunctional regulatory proteins or dysfunctional regulatory protein interactions. In preferred embodiments, the step of quantifying organizational parameters of domains within punctate distributions of at least two regulatory proteins within a nucleus includes the steps of acquiring at least one digital image of each punctate distribution; deconvoluting the digital image; identifying domains within each punctate distribution by image segmentation of the deconvoluted digital image; computing organizational parameters and performing statistical analysis of the organizational parameters.

In other preferred embodiments, the present invention provides a method of determining the contribution of the subnuclear organization of regulatory proteins to functional gene expression regulation, comprising the steps of quantifying organizational parameters of domains within punctate distributions of at least two regulatory proteins within a nucleus; performing factor analysis on the quantified organizational parameters; performing hierarchical cluster analysis, providing sequence information regarding the sequence of each of the regulatory proteins; providing functional information regarding the functional correlates of expression of each of the regulatory proteins; providing clinical information regarding the clinical consequences of expression of each of the regulatory proteins; comparing the results of the factor analysis, the hierarchical cluster analysis, the sequence information, the functional information, and the clinical information to determine the contribution of the subnuclear organization of regulatory proteins to functional gene expression regulation. In preferred embodiments, the results of the factor analysis are assessed by multidimensional plots of factor scores, which are compared with the sequence information, the functional information, and the clinical information. In other preferred embodiments, the multidimensional factor score plots are assessed to compare individual parameters of subnuclear organization with the sequence information, the functional information, and the clinical information. In other preferred embodiments, the results of the hierarchical cluster analysis, the sequence information, the functional information, and the clinical information are compared using a dendrogram.

In other preferred embodiments, the method of the present invention further includes discriminant analysis to characterize the distribution of a specific protein. In preferred embodiments, discriminant analysis of subnuclear protein distribution is useful to identify the presence of a specific known or unknown protein, providing a further means of protein identification.

In preferred embodiments, the invention provides a method of identifying a molecule by parameters of its subnuclear distribution, comprising the steps of quantifying organizational parameters of domains within subnuclear distributions of a molecule; performing factor analysis on the quantified organizational parameters; performing discriminant analysis on the quantified organizational parameters; comparing the results of the factor analysis and the results of the discriminant analysis to one or more standards thereby identifying a molecule by parameters of its subnuclear distribution. In general the molecule is identified by interaction between the molecule and a specific binding partner that is then visualized using a specific detectable reagent or by the detection of a fluorescent fusion protein. In preferred embodiments, the specific binding partner is an antibody, such as a polyclonal antibody, monoclonal antibody, Fab fragment or recombinant antibody. In embodiments in which the specific binding partner is an antibody, the specific detectable reagent is a secondary antibody labeled with a detectable tag, such as a radioisotope, enzyme, or a fluorophore. In preferred embodiments, the secondary antibody is labeled with a fluorophore. Typically, the method includes at least one method of discriminant analysis selected from a linear discriminant function, a quadratic discriminant function, and a nearest-neighbor analysis.

In certain preferred embodiments, the molecule is a Runx1 protein, a Runx2 protein, a RNA polymerase II, a SC35 protein, an AML-ETO fusion protein, a PML-RAR alpha fusion protein, an AML1-EVI1 fusion protein or an ALL fusion protein. Where the molecule is a Runx2 protein, the Runx2 protein can be the wild-type Runx2 protein, Runx2H246 mutant protein, Runx2 Y433A mutant protein, Runx2 Y407A mutant protein, Runx2 Y428A mutant protein, Runx2 R398A mutant protein or Runx2-ΔC protein. In some preferred embodiments the ALL fusion protein is ALL-1/MLL1.

In other embodiments, the present invention provides a method of classifying cells with a propensity for a condition, comprising the steps of quantifying organizational parameters of domains within subnuclear distributions of a protein associated with the condition; performing factor analysis on the quantified organizational parameters; performing discriminant analysis on the quantified organizational parameters; comparing the results of the factor analysis and the results of the discriminant analysis to one or more standards thereby classifying cells with a propensity for a condition by parameters of the subnuclear distribution of a protein associated with the condition. In preferred embodiments, the protein is a fusion protein, preferably an AML-ETO fusion protein, a PML-RAR alpha fusion protein, an AML1-EVI1 fusion protein or an ALL fusion protein. In certain preferred embodiments, the condition is acute myeloid leukemia, an autoimmune disorder or cleidocranial dysplasia.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1A depicts parameters that describe domain quantity and nuclear size that comprise group 1, which includes number of domains and domain density. FIG. 1B depicts parameters that describe domain size and variability that comprise group 2, which includes domain size mean, median, standard deviation, variance, skewness, kurtosis, coefficient of variation, and index of dispersion. FIG. 1C depicts parameters that describe the domain spatial randomness, which is based on domain nearest neighbor distances, that comprise group 3 which includes: domain nearest neighbor mean, median, standard deviation, variance, skewness, kurtosis, coefficient of variation, index of dispersion, domain density, nearest neighbor distance mean and variance expected for a random distribution, ratios between actual and expected mean and variance, and the standard error in the nearest neighbor distances. FIG. 1D depicts parameters that describe that characterize the radial position of domains that comprise group 4, which includes: mean perimeter radius, mean domain radius, mean relative domain radius.

FIGS. 6A-6E are graphic depictions of the results of studies that show that the post-mitotic restoration of the spatially ordered subnuclear organization is functionally conserved for the hematopoietic transcription factor Runx1 and the osteogenic transcription factor Runx2.

FIGS. 6A and 6B are reversed contrast grayscale images of fluorescence photomicrographs of interphase (FIG. 6A) and telophase (FIG. 6B) nuclei. Jurkat lymphoma cells were immunostained using a primary antibody specific for endogenous Runx1 and a secondary antibody labeled with an Alexa fluorophore. Digital images were acquired using a CCD camera coupled to a fluorescence microscope. Single image planes were deconvoluted and processed using an embodiment of the method of the present invention. Runx1 immunoreactivity was found to be distributed in punctate subnuclear domains that were distributed throughout the interphase and telophase nuclei. Black scale bar indicates 10 µm.

FIGS. 6C and 6D are reversed contrast grayscale images of fluorescence photomicrographs of interphase (FIG. 6C) and telophase (FIG. 6D) nuclei. ROS 17/2.8 osteosarcoma cells were immunostained using a primary antibody specific for endogenous Runx2 and a secondary antibody labeled with an Alexa fluorophore. Digital images were acquired using a CCD camera coupled to a fluorescence microscope. Single image planes were deconvoluted and processed using an embodiment of the method of the present invention. Runx2 immunoreactivity was found to be distributed in punctate subnuclear domains that were distributed throughout the interphase and telophase nucleus. Black scale bar indicates 10 µm.

FIG. 6E is a diagrammatic representation of the results of analysis using an embodiment of the method of the present invention. Subnuclear organization parameters were computed from deconvoluted images for both Runx1 and Runx2 for interphase nuclei, (I) and both progeny telophase nuclei, denoted at random as telophase nucleus 1, ($T_1$) or telophase nucleus 2, ($T_2$). Images of twenty-one nuclei immunostained for Runx1 were analyzed: nine of each telophase nucleus and three interphase nuclei. Images of thirty nuclei immunostained for Runx2 were analyzed: ten each for each category ($T_1$, $T_2$, and I) of nucleus. ANOVA was performed to assess the significance of observed differences between $T_1$, $T_2$, and I. Overall mean Clark and Evans statistics (Ro/Re) were ~1.4 for both endogenous Runx1 as well as Runx2, indicating a non-random organization with spatial order. Outer panels provide a graphical representation of mean parameter values where a color map shown here in grayscale) has been applied to the standardized data assigning red (dark gray) to higher values and green (paler gray) to lower values; see scale bar, where each increment of one reflects one standard deviation. Asterisks indicate statistically significant differences based on a 0.05 level with correction for false discovery rate. Bonferroni's multiple comparison tests were use to determine which nuclei differed significantly at a P=0.05 level. In each case significant differences were observed between each telophase ($T_1$,$T_2$) and interphase nuclei (I), but difference were not observed between telophase nuclei.

FIGS. 7A-7G are reversed contrast grayscale images of fluorescence photomicrographs of the nuclei of HeLa cells that were immunostained in situ using a primary antibody specific for endogenous Runx2 and a secondary antibody labeled with an Alexa fluorophore. Digital images were acquired using a CCD camera coupled to a fluorescence microscope. For NMTS mutation studies Z-series image stacks were acquired at 0.25 micron intervals with 56 nm/pixel (xy) resolution. Single image planes were deconvoluted and processed using an embodiment of the method of the present invention. Images show punctate subnuclear distributions for wild-type Runx2 (FIG. 7A), an HA-tagged C-terminal deletion (ΔC, FIG. 7B), mutant R398A (FIG. 7C), mutant Y428A (FIG. 7D), mutant Y433A (FIG. 7E), mutant Y407A (FIG. 7F) and mutant H426A (FIG. 7G). The black scale bar indicates 10 µm.

FIG. 7H is a diagrammatic representation of the position of the NMTS mutations in the C-terminal region where the locations of the mutations are shown schematically superimposed on the NMTS crystal structure.

FIG. 7I is a diagrammatic representation of the results of analysis using an embodiment of the method of the present invention. Using a repeated-measure analysis of variance (ANOVA), significant differences were detected at the P=0.05 level in 25 of 28 parameters measured, as indicated by asterisks.

FIG. 8A is a two-dimensional line plot of the average factor scores measured on each of the mutants individually and wild-type. Based on Factor A (average spatial properties), there are two groups of mutants that differ from wild-type: one composed of Runx2-ΔC and the R398A mutant protein, and a second composed of the remaining mutants. Based on Factor B (domain size variability), there are three groups: one of Y428A alone, a second of R398A and Runx2-ΔC, and a third of wild-type Runx2 and the remaining mutants. Based on Factor C (nearest neighbor distance variability), the R398A mutant alone is higher than the wild-type and the remaining mutants. When all Factors are considered, the R398A mutant protein and Runx2-ΔC differ most prominently from wild-type, followed by Y428A.

FIGS. 8B-8D show graphically the comparison of three parameters: number of domains (FIG. 8B), domain spatial randomness (FIG. 8C), and the size of domains (FIG. 8D) for each of the mutants and wild-type Runx2. ANOVA revealed that the observed differences were statistically significant on a 0.05 level. Bonferroni's multiple comparison test (0.05 level) was used to determine which means differed significantly from wild-type as indicated by asterisks. FIG. 8A shows that all mutants have significantly fewer domains than wild-type protein. However, the wild-type Runx2 protein and most of the NMTS mutant proteins showed a comparable non-random distribution with spatial order (FIG. 8C) and similar domain size (FIG. 8D). Both R398A and Runx2-ΔC are exceptions, exhibiting on average larger domains (FIG. 8D) and a more random spatial distribution (FIG. 8C) than the wild-type Runx2 protein.

In FIG. 10, cluster organization is illustrated using a dendrogram. Subnuclear organization data is presented in a compressed form with a color map as described in FIG. 6E. Shown at the bottom of the dendrogram is a symbolic representation of the extent to which each protein associates with the nuclear matrix as determined by biochemical fractionation and western blot analysis (i.e., ranging for "+++" (associated) for wild-type to "−" (no association for Runx2-ΔC) [our unpublished observations]. The schematic below indicates whether a protein will promote differentiation or is involved in disease, scored as "yes", "no", or "ND" (not determined).

FIGS. 11A and 11B are reversed contrast grayscale images of fluorescence photomicrographs of interphase (FIG. 11A) and telophase (FIG. 11B) nuclei. ROS 17/2.8 osteosarcoma cells were immunostained in situ using a primary antibody specific for endogenous Runx2 and a secondary antibody labeled with an Alexa fluorophore. Digital images were acquired using a CCD camera coupled to a fluorescence microscope. Runx2 immunoreactivity was distributed as punctate subnuclear domains throughout the interphase and telophase nuclei. The black scale bar indicates 10 μm.

FIG. 11C is a diagrammatic representation of the results of analysis using an embodiment of the method of the present invention. Subnuclear organization parameters were computed from deconvoluted images for interphase nuclei, (I) and both progeny telophase nuclei, denoted at random as telophase nucleus 1, ($T_1$) or telophase nucleus 2, ($T_2$). ANOVA was performed to assess the significance of observed differences between $T_1$, $T_2$, and I. Asterisks indicate statistically significant differences based on a 0.05 level with correction for false discovery rate. Bonferroni's multiple comparison tests were use to determine which nuclei differed significantly at a P=0.05 level. In each case significant differences were observed between each telophase ($T_1$,$T_2$) and interphase nuclei (I), but difference were not observed between telophase nuclei. Overall mean Clark and Evans statistics (Ro/Re) were 1.4 for Runx2, indicating a non-random organization with spatial order. Numeric values are found in Table 1.

DETAILED DESCRIPTION OF THE INVENTION

Figure 1A:
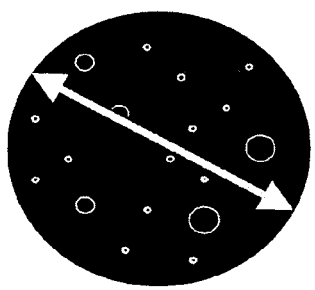
FIGS. 1A-1D are diagrammatic representations of a conceptual framework for the quantitation of subnuclear organization by an embodiment of the present invention, showing four main groups of parameters that are selected on the basis of inherent biological variability.

The present invention describes a novel framework for quantifying and analyzing the organization of nuclear protein domains based on measurements with variability that is related to biological function. Nuclear organization is defined utilizing multiple parameters that are evaluated simultaneously from digital fluorescence microscopic images. Data can then be analyzed using multivariate statistical approaches such as discrimination, classification, and/or cluster analysis for understanding biological control as well as for the assessment of disease states.

Multi-component macromolecular complexes that execute the fundamental nuclear processes of DNA replication, transcription and splicing are organized in discrete subnuclear foci. See Zaidi, S. K., et al., J. Cell Sci. 2001 114, 3093-3102. Examples of regulatory proteins that are targeted to subnuclear foci are Runx/Cbfa/AML factors, the multi-functional YY1 protein (Guo et al., Proc. Natl. Acad. Sci. USA 1995 92, 10526-10530), steroid hormone receptors (glucocorticoid receptor, estrogen receptor, vitamin D receptor, androgen receptor) (DeFranco and Guerrero, Crit. Rev. Eukaryotic Gene Expr. 2000 10, 39-44), Pitt transcription factor (Mancini et al., J. Cell. Biochem. 1999 72, 322-338), the co-repressor transducin-like enhancer (TLE; Javed et al., J. Cell Sci. 2000 113, 2221-2231), histone deacetylases and acetyl transferases (Davie, J. R. Mol. Biol. Rep. 1997 24, 197-207), and SWI/SNF chromatin-modifying complexes (Reyes et al., J. Cell Biol. 1997 137, 263-274.).

Runx transcription factors provide a convenient system for studying the compartmentalization of gene expression and nuclear matrix association of regulatory proteins. A conserved nuclear matrix targeting signal (NMTS) within the C-terminus directs Runx factors to matrix associated subnuclear sites that support transcriptional control in the interphase nucleus (Choi, J.-Y. et al. Proc. Natl. Acad. Sci., USA 98, 8650-8655 (2001); Zaidi, S. K. et al., J. Cell Sci. 114, 3093-3102 (2001); and Zeng, C. et al., Proc. Natl. Acad. Sci. USA 94, 6746-6751 (1997)). It has been also reported that the characteristic subnuclear distribution of Runx regulatory proteins is restored following mitosis (Zaidi, S. K. et al., Proc. Natl. Acad. Sci. USA 100, 14852-14855 (2003).

The hematopoietic Runx1 and osteogenic Runx2 transcription factors are involved in tissue-specific gene expression and support cell differentiation. In the interphase nucleus Runx proteins are associated with the nuclear matrix and are organized into punctate domains (Zaidi, S. K. et al. J. Cell Sci. 114, 3093-3102 (2001) and Zeng, C. et al. Proc. Natl. Acad. Sci. USA 94, 6746-6751 (1997)). These nuclear microenvironments spatially coincide with sites of active transcription and co-localize with several co-regulatory proteins (Thomas, D. M. et al. Molec. Cell 8, 303-316 (2001); Javed, A. et al. J. Cell Sci. 113, 2221-2231 (2000); Harrington, K. S. et al. J. Cell Sci. 115, 4167-4176 (2002); Zaidi, S. K. et al. Proc. Natl. Acad. Sci., USA 99, 8048-8053 (2002); Westendorf, J. J. et al. Mol. Cell Biol. 22, 7982-7992 (2002); and Kundi, M. et al. Nat. Genet. 32, 639-644 (2002). Evidence indicates a link between the activity of Runx proteins and their spatiotemporal organization within the nucleus. Runx2 protein domains have been reported to persist during mitosis, and undergo spatial and temporal reorganization resulting in equal partitioning into progeny nuclei (Zaidi, S. K. et al. Proc. Natl. Acad. Sci., USA 100, 14852-14857 (2003)). These mitotic alterations reflect natural perturbations in both nuclear structure and function and serve as a biological template for understanding Runx domain organization. Together, the dynamic distribution of Runx proteins provides a model for quantitative and comparative analysis of the subnuclear organization of regulatory proteins.

In the studies discussed herein, specific proteins were identified by binding of a specific binding partner, such as polyclonal antibodies that are specific to a particular protein, such as Runx2, or to a particular epitope, such as the HA epitope. The distribution of the specific binding partner is then visualized using a specific detectable reagent, in this case a secondary antibody labeled with a fluorophore. It is therefore understood that, as used herein, depending on context, "protein X" or "protein X subnuclear distribution" encompasses the more strict terms "protein X immunoreactivity" or "protein X immunoreactivity subnuclear distribution." In preferred embodiments, the method of the present invention can be used to characterize the subnuclear distribution of any analyte that can be associated with a specific binding partner and visualized using a specific detectable reagent.

The conceptual framework for quantifying nuclear organization as spatially organized protein domains within the nucleus in terms of parameters with inherent biological variability is outlined in FIG. 1 and briefly described here. Alterations in size and number of protein domains with respect to physiological conditions, cell cycle stage, and/or cellular differentiation have been observed (Ma, H. et al. J. Cell Biol. 143, 1415-1425 (1998); Stenoien, D. L. et al. Mol Cell Biol. 21, 4404-4412 (2001); Nielsen, J. A., Hudson, L. D. & Armstrong, R. C. J Cell Sci. 115, 4071-4079 (2002); and Zaidi, S. K. et al. Proc. Natl. Acad. Sci., USA 100, 14852-14857 (2003)). Intranuclear informatics exploits this variability in domain size and number, to elucidate changes between different biological conditions. Another prominent feature of nuclear organization is the non-random localization of chromosome territories and protein domains (Noordmans, H. J., van der, K. K., van Driel, R. & Smeulders, A. W. Cytometry 33, 297-309 (1998); Cremer, T. & Cremer, C. Nature Reviews Genetics 2, 292-301(2001); Shiels, C. et al. J Cell Sci. 114, 3705-3716 (2001); Kozubek, S. et al. Chromosoma 111, 321-331(2002); and Tanabe, H., et al., Mutat. Res. 504, 37-45 (2002)). In addition, the radial position within the nucleus of regulatory machinery for replication and transcription is functionally interrelated with the location of chromosomal territories and chromatin structure. Based on these biological observations, the method of the present invention quantitatively describes and defines intranuclear organization utilizing at least twenty-five parameters, evaluated from digital fluorescence microscopic images.

In preferred embodiments, the method incorporates first-order nearest neighbor statistics, commonly used in ecological studies (Clark, P. J. & Evans, F. C. Ecology 35, 445-453 (1954); Sinclair, D. F. Ecology 66, 1084-1085 (1985)) to characterize the spatial randomness of nuclear microenvironments.

Figure 1B:
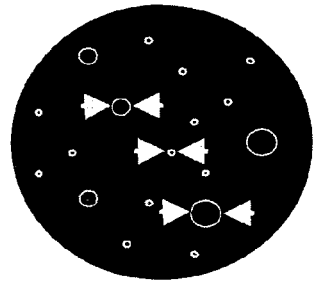
Figure 1C:
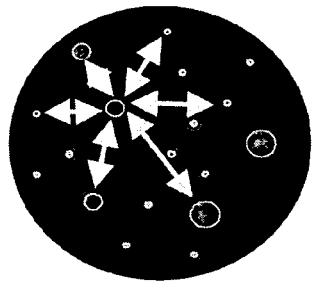
Figure 1D:
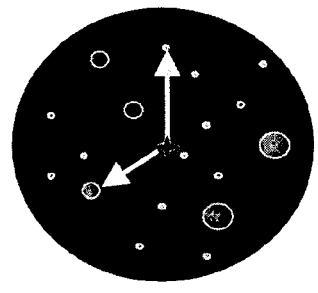

FIGS. 1A-1D are diagrammatic representations of a conceptual framework for the quantitation of subnuclear organization by an embodiment of the present invention, showing four main groups of parameters that are selected on the basis of inherent biological variability. FIG. 1A depicts parameters that describe domain quantity and nuclear size that comprise group 1, which includes number of domains and domain density. FIG. 1B depicts parameters that describe domain size and variability that comprise group 2, which includes domain size mean, median, standard deviation, variance, skewness, kurtosis, coefficient of variation, and index of dispersion. FIG. 1C depicts parameters comprising group 3 that describe the domain spatial randomness, which is based on domain nearest neighbor distances, and includes domain nearest neighbor mean, median, standard deviation, variance, skewness, kurtosis, coefficient of variation, index of dispersion, domain density, nearest neighbor distance mean and variance expected for a random distribution, ratios between actual and expected mean and variance, and the standard error in the nearest neighbor distances. FIG. 1D depicts parameters that describe that characterize the radial position of domains that comprise group 4, which includes: mean perimeter radius, mean domain radius, mean relative domain radius.

Figure 2:
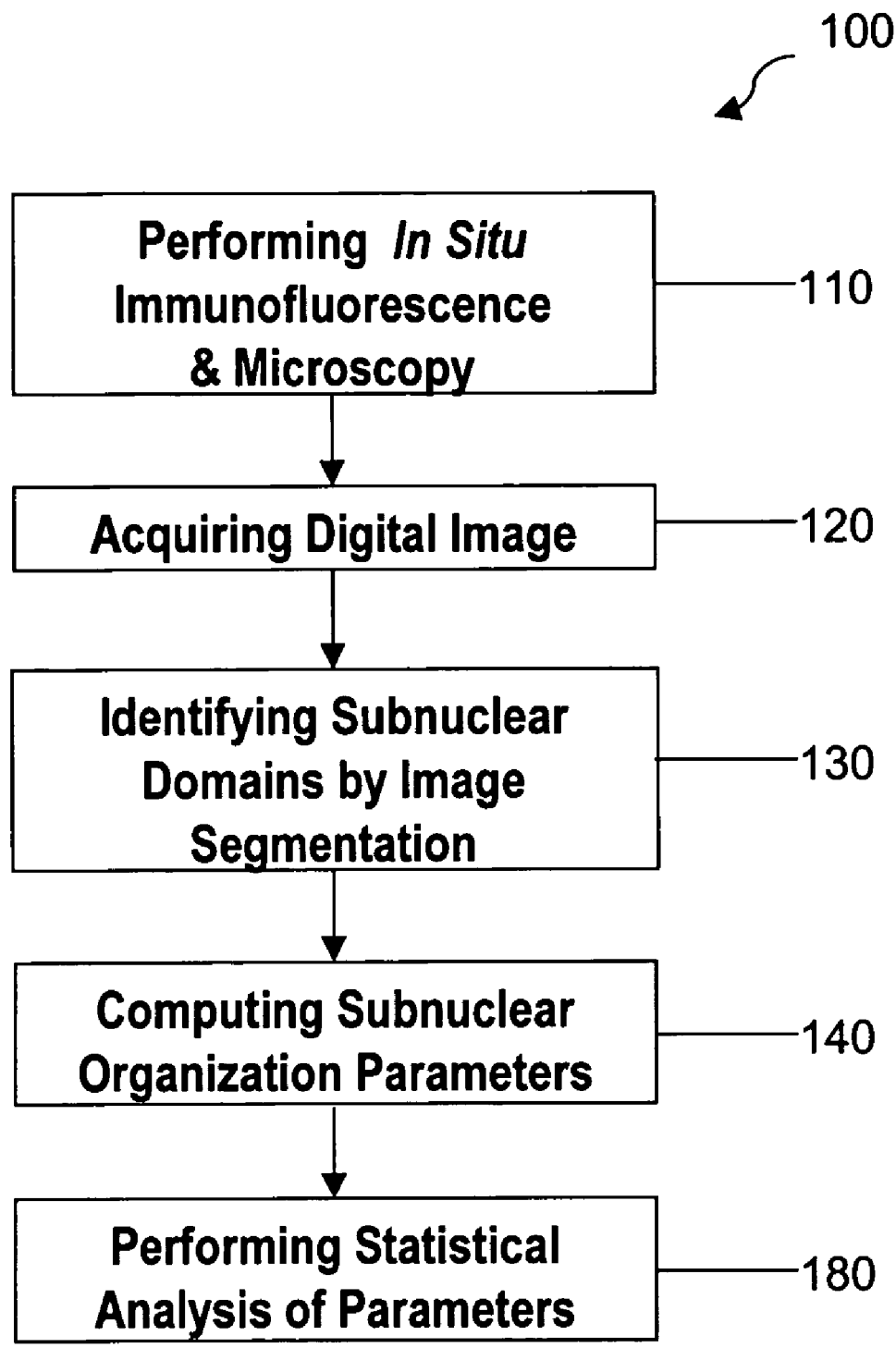
FIG. 2 is a schematic representation of an embodiment of the method of the present invention 100, comprising the steps of performing in situ immunofluorescence and microscopy 110, acquiring digital images 120, identifying subnuclear domains by image segmentation 130, computing subnuclear organization parameters 140 and performing statistical analysis of parameters 180.

FIG. 2 is a schematic representation of an embodiment of the method of the present invention 100, comprising the steps of performing in situ immunofluorescence and microscopy 110, acquiring digital images 120, identifying subnuclear domains by image segmentation 130, computing subnuclear organization parameters 140 and performing statistical analysis of parameters 180.

Figure 3:
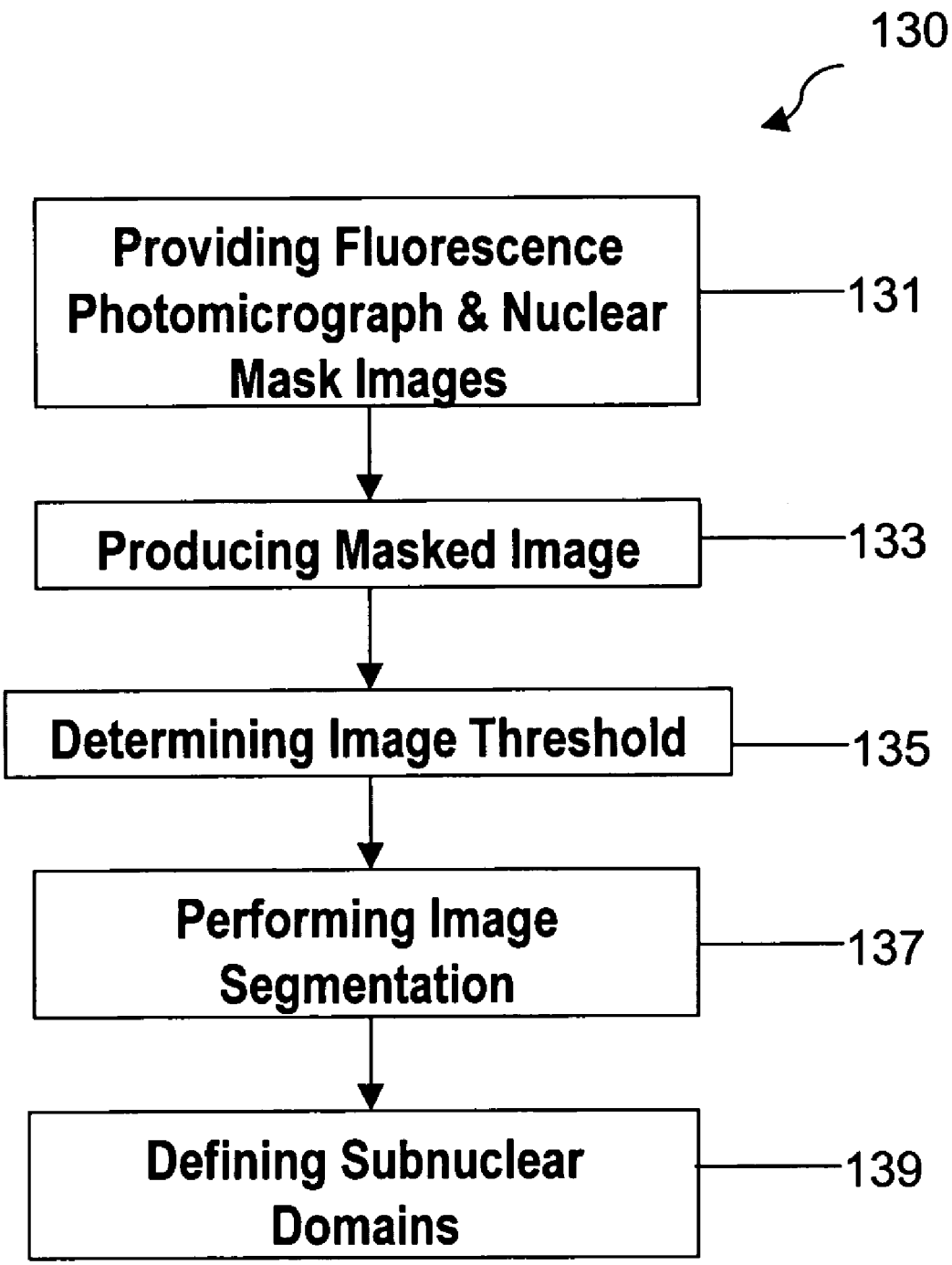
FIG. 3 is a schematic representation of an embodiment of the method of the invention in which the step of defining subnuclear domains by image segmentation 130 further comprises the steps of providing a fluorescence photomicrographic image and a nuclear mask image 131, producing a masked image 133, determining an image threshold 135, performing image segmentation 137 and defining subnuclear domains 139.

FIG. 3 is a schematic representation of an embodiment of the method of the invention in which the step of defining subnuclear domains by image segmentation 130 further comprises the steps of providing a fluorescence photomicrographic image and a nuclear mask image 131, producing a masked image 133, determining an image threshold 135, performing image segmentation 137 and defining subnuclear domains 139.

Figure 4:
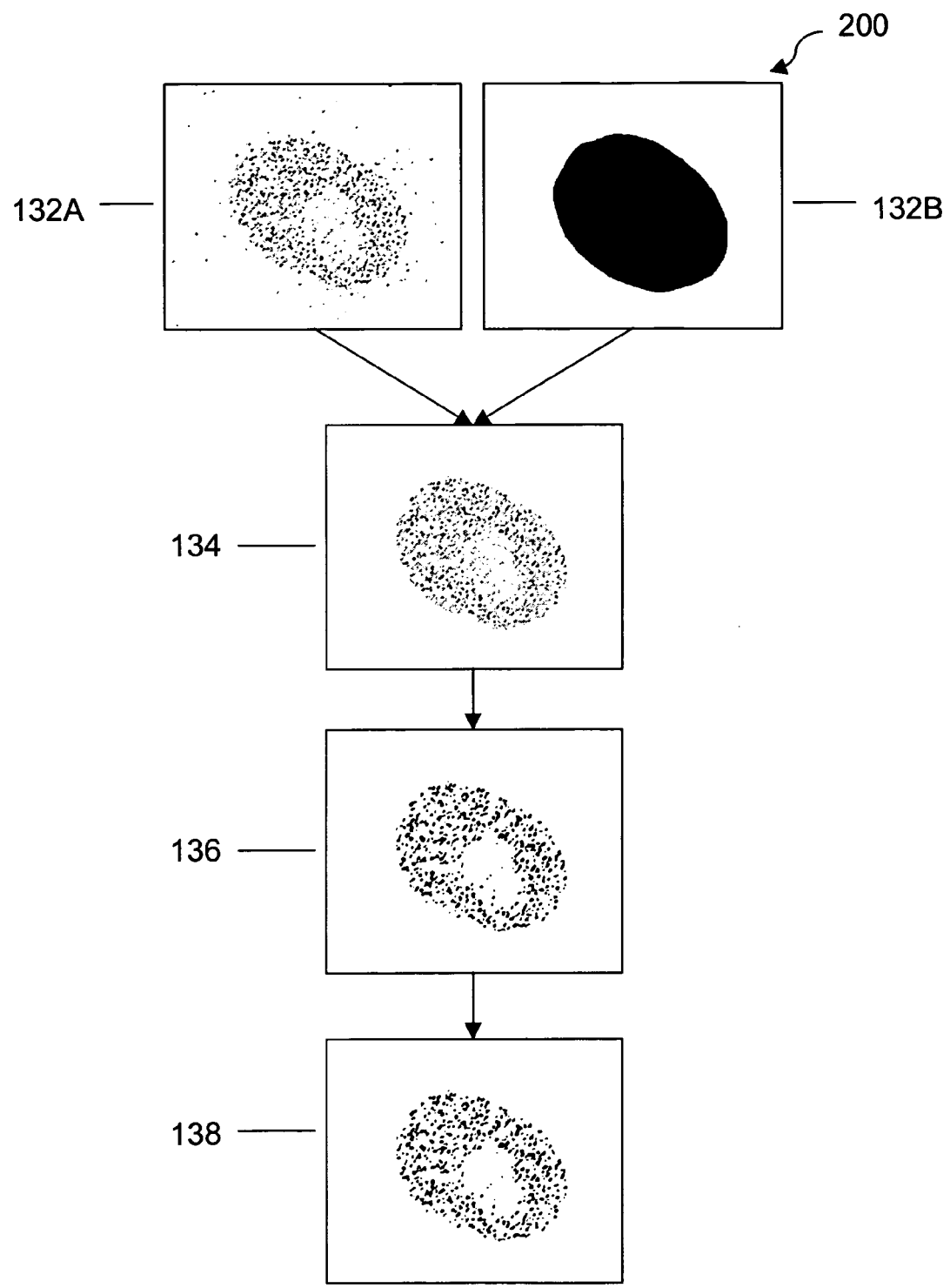
FIG. 4 is a graphic illustration of images produced by the embodiment of the method of the invention illustrated in FIG. 3, in which step 131 yields a fluorescence photomicrographic image 132A and a nuclear mask image 132B, step 133 produces a masked image 134, step 135 produces an image threshold 136, and step 137 yields a segmented image 138.

FIG. 4 is a graphic illustration of images produced by the embodiment of the method of the invention illustrated in FIG. 3, in which step 131 yields a fluorescence photomicrographic image 132A and a nuclear mask image 132B, step 133 produces a masked image 134, step 135 produces an image threshold 136, and step 137 yields a segmented image 138.

Figure 5A:
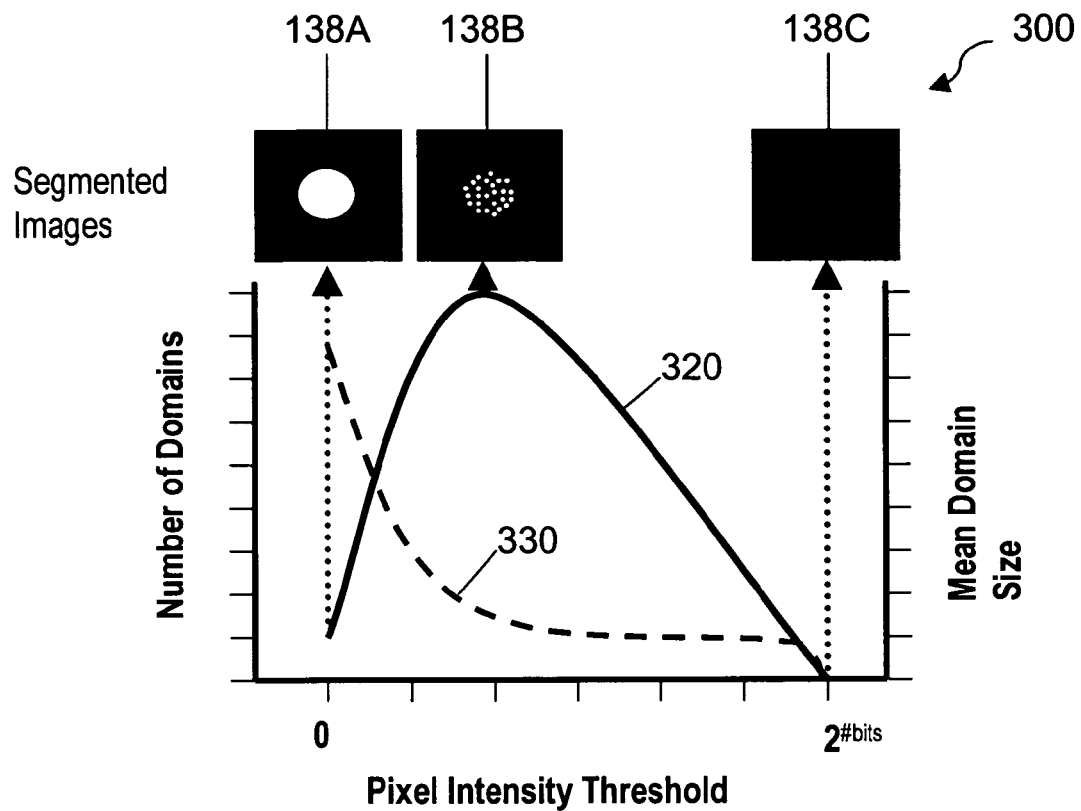
FIG. 5A is a schematic illustration of an embodiment of the process of determining the image threshold, showing graphs of the relationships between the number of domains and the pixel intensity threshold (solid line 320, left ordinate) and the mean domain size and the pixel intensity threshold (dashed line 330, right ordinate), with illustrative segmented images at the minimum possible threshold (one large domain, 138A), the maximum possible threshold (no domains, 138C) and at a threshold chosen at the pixel intensity that maximizes the number of definable domains.

FIG. 5A is a schematic illustration of an embodiment of the process of determining the image threshold, showing graphs of the relationships between the number of domains and the pixel intensity threshold (solid line 320, left ordinate) and the mean domain size and the pixel intensity threshold (dashed line 330, right ordinate), with illustrative segmented images at the minimum possible threshold (one large domain, 138A), the maximum possible threshold (no domains, 138C) and at a threshold chosen at the pixel intensity that maximizes the number of definable domains.

The method of the present invention, termed intranuclear informatics, has been applied to understand the spatial organization of endogenous Runx1 and Runx2 domains in the interphase nucleus as well as following mitosis. Immunofluorescence microscopy confirms that both proteins are distributed in punctate subnuclear domains, and this distribution has been analyzed and compared at least twenty-five parameters of subnuclear organization in interphase and in both telophase nuclei.

The underlying requirements for Runx domain organization were examined using deletion and point mutations of the nuclear matrix targeting signal (NMTS). The NMTS is a conserved and unique Runx protein motif that is necessary and sufficient for directing the protein to matrix associated intranuclear sites. Biochemical, cellular, and in vivo genetic approaches have established the requirement of the NMTS and associated functions in Runx control of cell differentiation and tissue-specific development (Choi, J.-Y. et al. Proc. Natl. Acad. Sci., USA 98, 8650-8655 (2001); Yergeau, D. A. et al. Nat. Genet. 15, 303-306 (1997)). Mutations in Runx proteins that alter subnuclear targeting are associated with skeletal disease and leukemia (McNeil, S. et al. Proc. Natl. Acad. Sci. U.S.A. 96, 14882-14887 (1999); Choi, J.-Y. et al. Proc. Natl. Acad. Sci., USA 98, 8650-8655 (2001); Barseguian, K. et al. Proc. Natl. Acad. Sci. U.S. A 99, 15434-15439 (2002); and Zhang, Y. W. et al. Gene 244, 21-28 (2000)).

Mutagenesis, microscopy, and intranuclear informatics were combined in an effort to understand the contribution of the NMTS to Runx domain organization, using wild-type Runx2, a C-terminal deletion (Runx2-ΔC) that lacks the NMTS, as well as NMTS point mutations that result in amino acid substitution. These mutants exhibit varying degrees of compromised intranuclear targeting and selective alterations in physical and functional protein-protein interactions (Zaidi, S. K. et al. Proc. Natl. Acad. Sci., USA 99, 8048-8053 (2002). Intranuclear informatics analysis was performed on deconvoluted images from nuclei of cells expressing these proteins.

Example 1

Figures 11A, 11B:
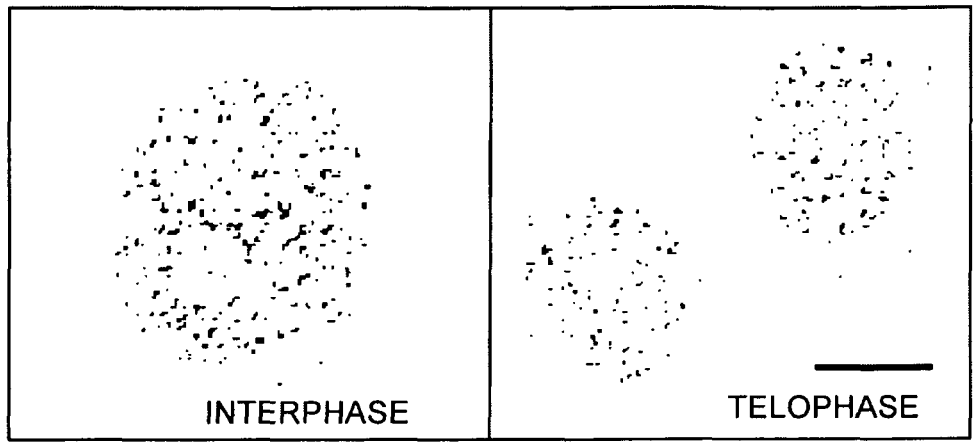
FIGS. 11A, 11B and 11C are graphic depictions of the results of studies that show that the post-mitotic restoration of the spatially ordered subnuclear organization of the Runx2 protein is functionally conserved.
Figure 11C:
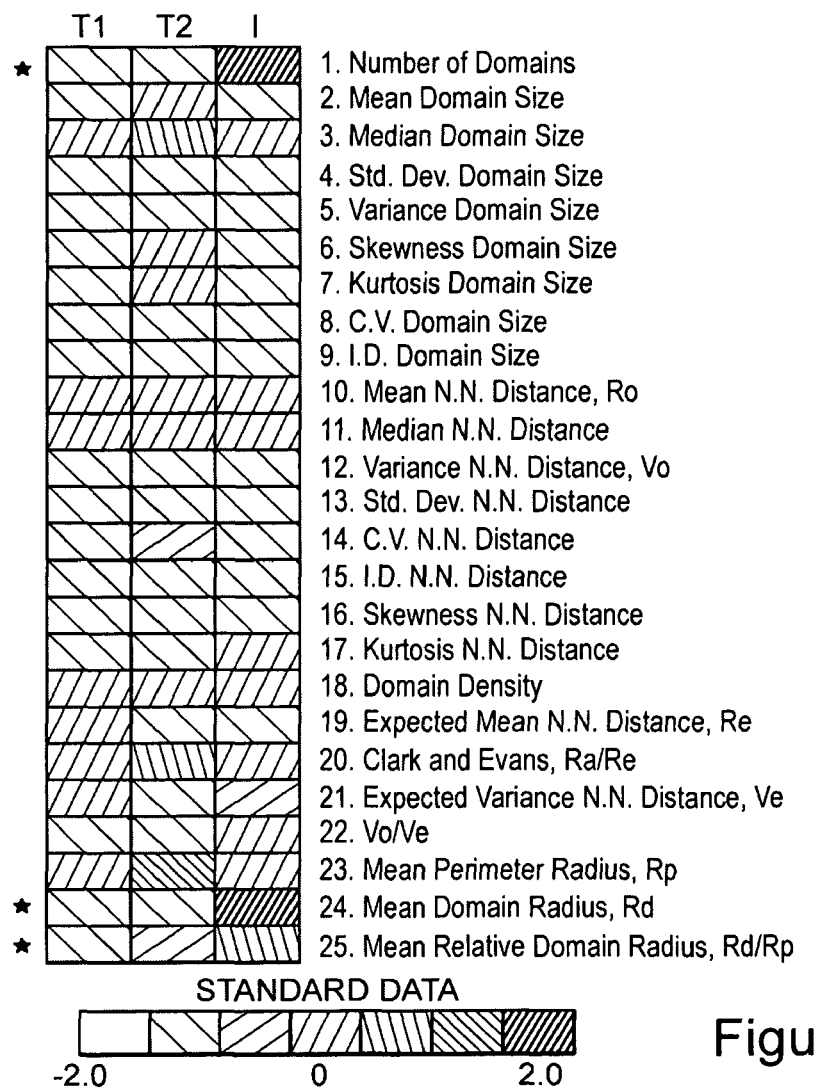

FIGS. 11A, 11B and 11C are graphic depictions of the results of studies that show that the post-mitotic restoration of the spatially ordered subnuclear organization of the Runx2 protein is functionally conserved between progeny nuclei.

Cell Culture and Transfections

ROS 17/2.8 osteosarcoma cells were maintained in F12 with PS, 2 mM L-glutamine, and 5% FBS. Hela cells were maintained in DMEM with PS, 2 mM L-glutamine, and 10% FBS. Exponentially growing HeLa cells were transfected using with 500 ng of either HA-tagged wild-type Runx2, an HA-tagged C-terminal deletion, or one of the HA tagged NMTS point mutants for 24 hrs with Superfectamine (Invitrogen, San Diego, Calif.).

Immunofluorescence

Hela and Ros cells were grown on gelatin-coated coverslips (BD Biosciences, Lexington, Ky.). Cells were processed for in situ immunofluorescence as described above in Example 1. In brief, cells were rinsed twice with ice-cold PBS and fixed in 3.7% formaldehyde in PBS for 10 minutes on ice. After rinsing once with PBS, the cells were permeabilized in 0.1% Triton X-100 in PBS, and rinsed twice with PBSA (0.5% bovine serum albumin [BSA] in PBS) followed by antibody staining. Antibodies and their dilutions used are as follows: rabbit polyclonal antibodies against Runx2 (1:200; Oncogene, Carlsbad, Calif.) and rabbit polyclonal antibodies against HA-epitope (1:500, Santa Cruz Biotechnology, Santa Cruz, Calif.). The secondary antibodies used were either anti rabbit or mouse Alexa 568 or Alexa 488 (1:800, Molecular Probes, Eugene, Oreg.).

Statistical Analyses

For mitosis studies ANOVA tests were conducted on subnuclear organization data to determine the significance of observed differences in each parameter. Asterisks indicate parameters with differences that are considered to be statistically significant on a 0.05 level. P-values were adjusted to account for the false-discovery rate; asterisks are indicative of this adjustment. Analysis was performed using the general linear model (GLM) procedures in SAS/STAT (SAS Institute Inc., Cary, N.C.). These statistical tests were conducted to compare among telophase nuclei ($T_1$ and $T_2$) and interphase (I). Sixty nuclei were analyzed for Runx2; twenty for each nucleus. For NMTS studies, statistical tests were conducted to compare among wild-type Runx2 and each of the five mutants. In total, 330 Z-sections were analyzed, 55 for each protein from two independent experiments. Five Z-sections were analyzed per cell to account for within cell variability.

Thus, the effect of NMTS mutation was assessed using a repeated measure ANOVA at a 0.05 level.

Factor analysis was performed on parameters of subnuclear organization for each of the wild-type Runx and the five mutant proteins using the data obtained from 330 nuclear images. This analysis represents the observed subnuclear organization parameters in terms of a smaller number of uncorrelated "Factors" (or groups of parameters) that account for most of the information contained in the complete data set as described above. Factors are extracted using principal component analysis and rotated using the varimax method. Factors scores were computed for each image and represent the sum of the standardized subnuclear organization parameters multiplied by their respective Factor loadings. Factor loading refers to the correlation of each subnuclear organization parameter with a particular Factor. Factor loadings greater than 0.65 were considered to be significant. This analysis was carried out using the Factor procedure in SAS/STAT.

Hierarchical cluster analysis was performed on mean subnuclear organization parameters from wild-type Runx and the mutant proteins using the data from 330 nuclear images. Cluster analysis was performed using the Euclidean distance metric with complete linkage. Clusters were displayed using a dendrogram. Cluster analysis was carried out using the cluster procedure in SAS/STAT.

FIGS. 11A and 11B are reversed contrast grayscale images of fluorescence photomicrographs of interphase (FIG. 11A) and telophase (FIG. 11B) nuclei. ROS 17/2.8 osteosarcoma cells were immunostained in situ using a primary antibody specific for endogenous Runx2 and a secondary antibody labeled with an Alexa fluorophore. Digital images were acquired using a CCD camera coupled to a fluorescence microscope. Runx2 immunoreactivity was distributed as punctate subnuclear domains throughout the interphase and telophase nuclei. The black scale bar indicates 10 µm.

FIG. 11C is a diagrammatic representation of the results of analysis using an embodiment of the method of the present invention. Subnuclear organization parameters were computed from deconvoluted images for interphase nuclei, (I) and both progeny telophase nuclei, denoted at random as telophase nucleus 1, ($T_1$) or telophase nucleus 2, ($T_2$). ANOVA was performed to assess the significance of observed differences between $T_1$, $T_2$, and I. Asterisks indicate statistically significant differences based on a 0.05 level with correction for false discovery rate. Bonferroni's multiple comparison tests were use to determine which nuclei differed significantly at a $P=0.05$ level. In each case significant differences were observed between each telophase ($T_1$,$T_2$) and interphase nuclei (I), but difference were not observed between telophase nuclei. Overall mean Clark and Evans statistics (Ro/Re) were 1.4 for Runx2, indicating a non-random organization with spatial order. Numeric values are found in Table 1, below.

Figure 6E:
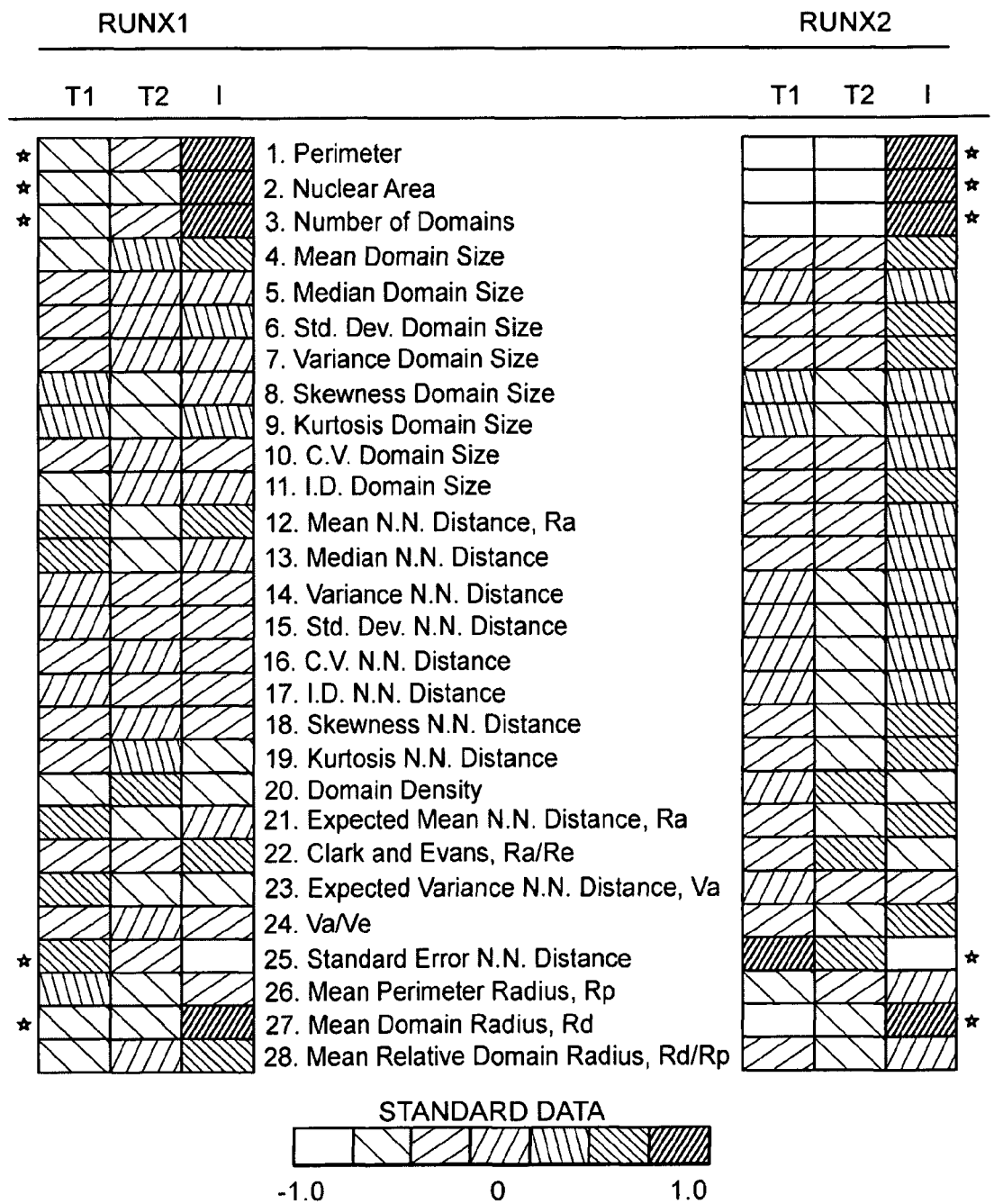

Quantitative results show that most parameters of Runx2 protein distributions are comparable between interphase and telophase nuclei, as was found for both Runx1 and Runx2 proteins (cf. FIG. 6E). As expected, telophase nuclei are significantly smaller than interphase nuclei. The number of domains is equivalent between progeny telophase nuclei, and is higher in the interphase nuclei. This observation is consistent with the mitotic partitioning of Runx proteins (Zaidi, S. K. et al. Proc. Natl. Acad. Sci., USA 100, 14852-14857 (2003)). Runx2 domains exhibit a non-random organization with spatial order. The evidence supports a conclusion that the post-mitotic restoration of Runx subnuclear organization is functionally conserved.

TABLE 1

Runx2 Distribution, Interphase vs. Telophase
Subnuclear organization parameters
(Standardized values)

|  | T1 | T2 | Interphase |
|---|---|---|---|
| Number of domains * | −0.301 | −0.269 | 1.754 |
| Mean domain size | −0.262 | 0.025 | −0.252 |
| Median domain size | 0.272 | 0.506 | 0.243 |
| Stdev domain size | −0.391 | −0.157 | −0.353 |
| Variance domain size | −0.317 | −0.178 | −0.287 |
| Skewness domain size | −0.442 | −0.051 | −0.232 |
| Kurtosis domain size | −0.363 | 0.047 | −0.137 |
| CV domain size | −0.525 | −0.299 | −0.463 |
| ID domain size | −0.389 | −0.209 | −0.347 |
| Mean NN Distance | 0.048 | 0.231 | −0.073 |
| Median NN Distance | 0.051 | 0.292 | 0.069 |
| Variance NN Distance | −0.228 | −0.584 | −0.350 |
| Stdev NN Distance | −0.223 | −0.604 | −0.334 |
| CV NN Distance | −0.246 | −0.687 | −0.302 |
| ID NN Distance | −0.245 | −0.637 | −0.341 |
| Skewness NN Distance | −0.432 | −0.216 | −0.204 |
| Kurtosis NN Distance | −0.412 | −0.134 | 0.071 |
| Domain Density | −0.014 | 0.225 | −0.087 |
| Re | 0.014 | −0.245 | −0.316 |
| Ro/Re | 0.034 | 0.622 | 0.337 |
| Ve | 0.043 | −0.224 | −0.671 |
| Vo/Ve | −0.294 | −0.610 | −0.020 |
| Rp | 0.058 | 0.999 | −0.068 |
| Rd * | −0.287 | −0.253 | 1.654 |
| Rd/Rp * | −0.155 | −0.796 | 0.610 |

Point mutations within the Runx2 NMTS were generated using PCR-mediated mutagenesis. The locations of the mutations are shown schematically in FIG. 7H, superimposed on the NMTS crystal structure (Tang, L. et al. Crystal structure of the nuclear matrix targeting signal of the transcription factor AML-1/PEBP2aB/CBFa2. J. Biol. Chem. 274, 33580-33586 (1999)). Deconvoluted images of whole cells (HeLa) expressing XPress-tagged wild-type Runx2 and either an HA-tagged C-terminal deletion or one of the four HA-tagged NMTS point mutants were analyzed. Z-series image stacks were acquired at 0.25 micron intervals with 67 nm/pixel (xy). As shown, each of these mutants and wild-type Runx exhibits a punctate subnuclear distribution (FIGS. 12A-12F). Standardized mean subnuclear organization data for the indicated proteins are shown graphically in FIG. 12G and in Table 2. Analysis of variance (ANOVA) demonstrated significant differences at a P=0.05 level in 20 of 25 parameters measured, as indicated by asterisks.

Figures 12A, 12B, 12C, 12D, 12E, 12F:
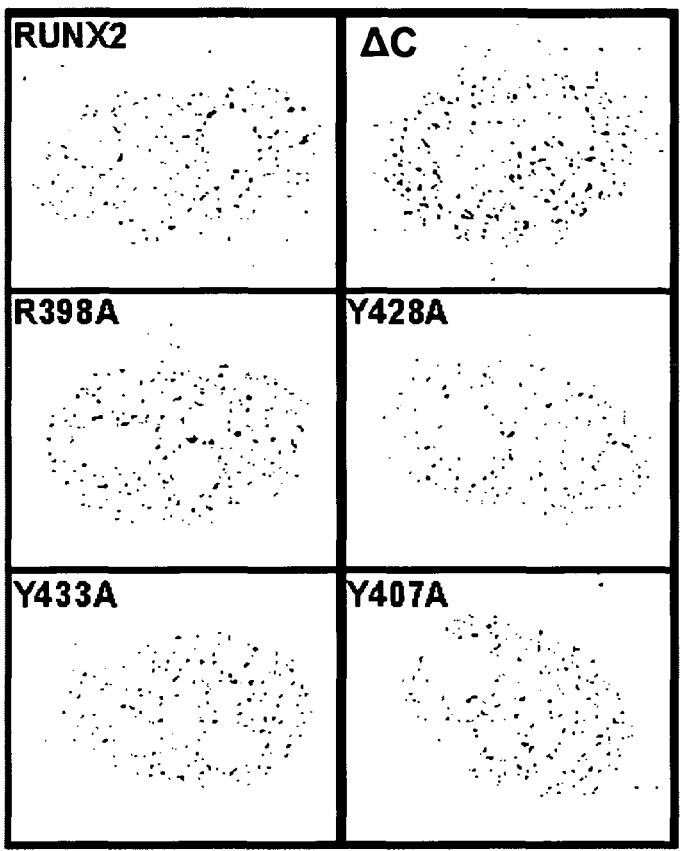
FIGS. 12A-12F are reversed contrast grayscale images of fluorescence photomicrographs of nuclei of HeLa cells that were immunostained in situ using an appropriate specific primary antibody and a secondary antibody labeled with an Alexa fluorophore, showing punctate subnuclear distributions for wild-type Runx2 protein (FIG. 12A), an HA-tagged C-terminal deletion (ΔC, FIG. 12B), mutant R398A (FIG. 12C), mutant Y428A (FIG. 12D), mutant Y433A (FIG. 12E) and mutant Y407A (FIG. 12F). Black scale bar indicates 10 μm.

FIGS. 12A-12F and 812G provide graphic depictions of the results of studies that show that the mutation of NMTS alters the interphase subnuclear organization of the Runx2 protein. FIGS. 12A-12F are reversed contrast grayscale images of fluorescence photomicrographs of nuclei of HeLa cells that were immunostained in situ using a specific primary antibody, labeled using a fluorophore-tagged secondary antibody and visualized using microscopy, showing punctate subnuclear distributions for wild-type Runx2 (FIG. 12A), an HA-tagged C-terminal deletion (ΔC, FIG. 12B), mutant R398A (FIG. 12C), mutant Y428A (FIG. 12D), mutant Y433A (FIG. 12E) and mutant Y407A (FIG. 12F). Black scale bar indicates 10 µm.

Figure 12G:
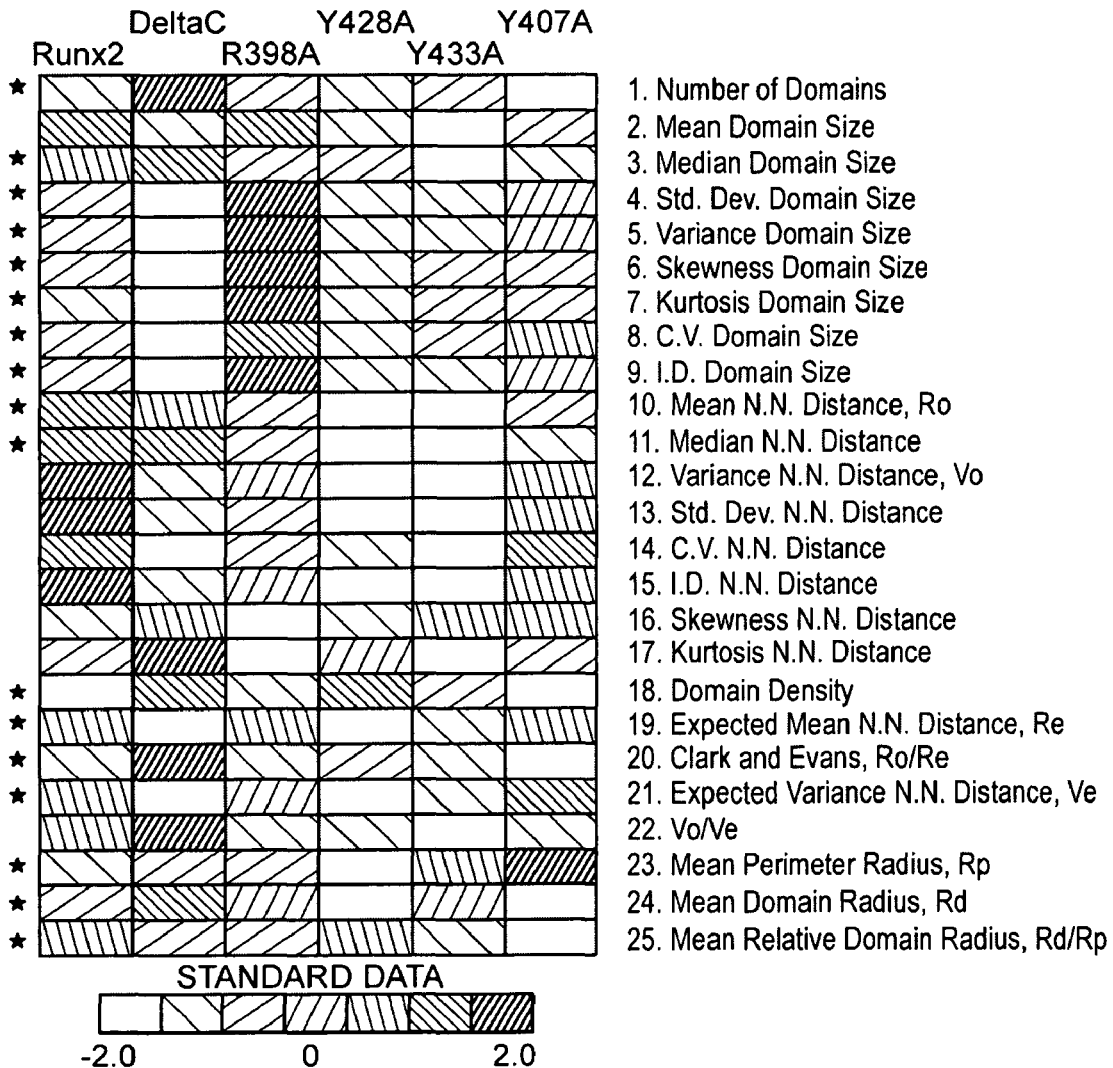
FIG. 12G is a diagrammatic representation of the results of the analysis of data represented by FIGS. 12A-12F using an embodiment of the method of the present invention. Using a repeated-measure analysis of variance (ANOVA), significant differences were detected at the P=0.05 level in 17 of 25 parameters measured, as indicated by asterisks.

FIG. 12G is a diagrammatic representation of the results of analysis using an embodiment of the method of the present invention. Using a repeated-measure analysis of variance (ANOVA), significant differences were detected at the P=0.05 level in 17 of 25 parameters measured, as indicated by asterisks.

TABLE 2

Wild Type and Mutant Proteins
Subnuclear organization parameters
(Standardized values)

| | Genotype | | | | | |
|---|---|---|---|---|---|---|
| | WT | ΔC | R398A | Y428A | Y433A | Y407A |
| Number of domains | −0.293 | 1.778 | 0.104 | −0.774 | 0.230 | −1.044 |
| Mean domain size | 1.192 | −0.622 | 1.078 | −0.677 | −1.228 | 0.257 |
| Median domain size | 0.649 | 1.245 | 0.145 | 0.256 | −1.541 | −0.754 |
| Stdev domain size | 0.436 | −1.414 | 1.361 | −0.660 | −0.354 | 0.631 |
| Variance domain size | 0.127 | −1.327 | 1.607 | −0.511 | −0.380 | 0.484 |
| Skewness domain size | 0.001 | −1.549 | 1.435 | −0.561 | 0.357 | 0.317 |
| Kurtosis domain size | −0.132 | −1.423 | 1.628 | −0.457 | 0.085 | 0.300 |
| CV domain size | 0.031 | −1.610 | 1.164 | −0.624 | 0.269 | 0.769 |
| ID domain size | 0.006 | −1.445 | 1.486 | −0.552 | −0.115 | 0.620 |
| Mean NN Distance | 1.094 | 0.804 | 0.438 | −1.249 | −1.182 | 0.096 |
| Median NN Distance | 1.063 | 1.061 | 0.291 | −1.041 | −1.249 | −0.125 |
| Variance NN Distance | 1.314 | −0.318 | 0.504 | −0.995 | −1.202 | 0.696 |
| Stdev NN Distance | 1.326 | −0.285 | 0.399 | −1.042 | −1.157 | 0.759 |
| CV NN Distance | 1.211 | −0.968 | 0.337 | −0.808 | −0.836 | 1.063 |
| ID NN Distance | 1.285 | −0.698 | 0.494 | −0.938 | −1.001 | 0.858 |
| Skewness NN Distance | −0.401 | 0.842 | −1.686 | −0.294 | 0.680 | 0.859 |
| Kurtosis NN Distance | −0.019 | 1.437 | −1.266 | 0.611 | −0.959 | 0.197 |
| Domain Density | −0.984 | 1.184 | −0.622 | 1.165 | 0.180 | −0.923 |
| Re | 0.963 | −1.194 | 0.648 | −1.067 | −0.338 | 0.988 |
| Ro/Re | −0.414 | 1.816 | −0.441 | 0.411 | −0.351 | −1.022 |
| Ve | 0.927 | −1.250 | 0.606 | −0.975 | −0.368 | 1.061 |
| Vo/Ve | 0.862 | 1.338 | −0.158 | −0.446 | −1.494 | −0.102 |
| Rp | −0.730 | −0.047 | 0.027 | −1.386 | 0.704 | 1.431 |
| Rd | 0.131 | 1.198 | 0.516 | −1.299 | 0.576 | −1.123 |
| Rd/Rp | 0.704 | 0.396 | 0.313 | 0.933 | −0.611 | −1.734 |

Factor Analysis

Factor analysis was performed to reduce the number of variables that are to be analyzed while retaining the information in the complete data set. This analysis represents the observed subnuclear organization parameters in terms of a smaller number of uncorrelated "factors" (or groups of parameters) that describe most of the variation in the data (Norman, G. R. Biostatistics: The Bare Essentials. Decker, Inc., Hamilton, Ontario (2000)). Factors are extracted using principal component analysis and rotated using the varimax method.

Initially, there are as many factors as there are original parameters. By convention, factors are ordered in descending manner according to the extent to which they account for the total variability (or information) in the original data set. There are two general criteria for selecting factors, illustrated below with reference to an exemplary data set.

Figure 5B:
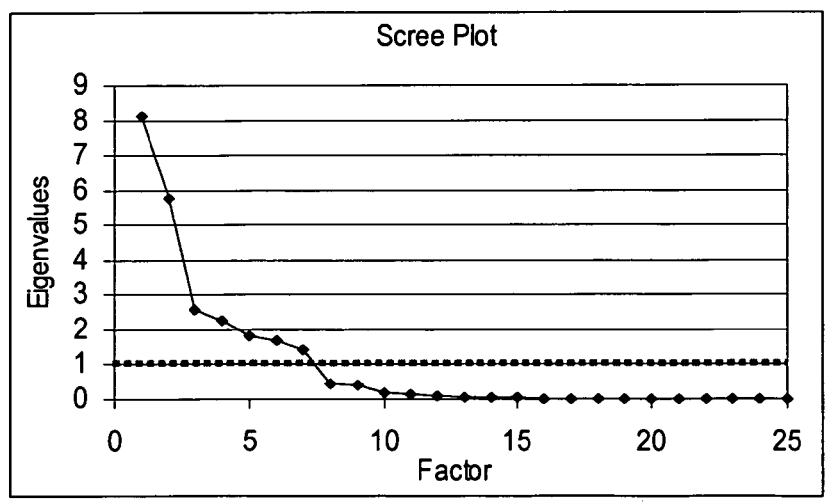
FIG. 5B is a scree plot, i.e., a graphical representation of the relationship between eigenvalues and corresponding factors, showing eigenvalues above 1 for seven factors.

The first selection criterion is established using a so-called scree plot, which is a plot of the eigenvalues of each of the factors (FIG. 5B). The eigenvalues essentially give a weight to each factor that relates to the amount each factor accounts for the total variability. The rule-of-thumb is to examine the factors which have eigenvalues greater than one, which in this example leads to the selection of seven factors (see Table 3 below, and FIG. 5B).

The second selection criterion is that each the factors should correlate significantly with at least three of the original parameters. Factor scores were computed for each image and represent the sum of the standardized subnuclear organization parameters multiplied by their respective factor loadings. Factor loading refers to the correlation of each subnuclear organization parameter with a particular factor. A significant correlation in our exemplary case is considered to be above 0.65. This analysis was carried out using the Factor procedure in SAS/STAT.

TABLE 3

Correlation of Factors With Parameters By Means of Factor Scores

| | Factor1 | Factor2 | Factor3 | Factor4 | Factor5 | Factor6 | Factor7 |
|---|---|---|---|---|---|---|---|
| Number of domains | −0.117 | −0.341 | −0.068 | 0.888 | 0.005 | −0.040 | 0.023 |
| Mean domain size | 0.662 | 0.063 | 0.110 | −0.138 | −0.060 | 0.047 | 0.629 |
| Median domain size | 0.100 | 0.070 | −0.091 | −0.004 | −0.018 | 0.049 | 0.972 |
| Stdev domain size | 0.937 | 0.020 | 0.137 | −0.108 | −0.027 | 0.032 | 0.237 |
| Variance domain size | 0.932 | 0.007 | 0.092 | −0.040 | −0.035 | 0.036 | 0.087 |
| Skewness domain size | 0.896 | −0.035 | 0.069 | 0.009 | 0.084 | 0.026 | −0.043 |
| Kurtosis domain size | 0.896 | −0.037 | 0.050 | 0.051 | 0.078 | 0.023 | −0.085 |
| CV domain size | 0.950 | −0.018 | 0.162 | −0.109 | 0.003 | 0.011 | −0.021 |
| ID domain size | 0.972 | 0.003 | 0.117 | −0.059 | −0.021 | 0.028 | 0.050 |
| Mean NN Distance | −0.070 | 0.941 | 0.146 | 0.131 | 0.079 | 0.006 | 0.114 |
| Median NN Distance | −0.110 | 0.912 | 0.115 | 0.164 | −0.013 | 0.016 | 0.141 |
| Variance NN Distance | 0.105 | 0.466 | 0.867 | −0.014 | 0.067 | −0.002 | −0.018 |
| Stdev NN Distance | 0.108 | 0.502 | 0.850 | −0.002 | 0.092 | −0.008 | −0.003 |

TABLE 3-continued

Correlation of Factors With Parameters By Means of Factor Scores

|                      | Factor1 | Factor2 | Factor3 | Factor4 | Factor5 | Factor6 | Factor7 |
|---|---|---|---|---|---|---|---|
| CV NN Distance       | 0.172   | 0.125   | 0.950   | −0.064  | 0.072   | −0.013  | −0.063  |
| ID NN Distance       | 0.134   | 0.318   | 0.922   | −0.038  | 0.057   | −0.004  | −0.045  |
| Skewness NN Distance | 0.055   | 0.071   | 0.126   | −0.051  | 0.951   | −0.030  | −0.050  |
| Kurtosis NN Distance | −0.036  | 0.013   | 0.145   | 0.053   | 0.953   | 0.019   | 0.013   |
| Domain Density       | −0.025  | −0.913  | −0.235  | 0.045   | −0.018  | 0.042   | 0.036   |
| Re                   | 0.042   | 0.902   | 0.285   | −0.107  | 0.016   | −0.030  | −0.048  |
| Ro/Re                | −0.155  | −0.376  | −0.269  | 0.349   | 0.068   | 0.061   | 0.234   |
| Ve                   | 0.053   | 0.881   | 0.297   | −0.157  | 0.016   | −0.027  | −0.047  |
| Vo/Ve                | 0.118   | −0.036  | 0.960   | 0.122   | 0.124   | 0.014   | 0.037   |
| Rp                   | −0.085  | 0.187   | 0.048   | 0.360   | −0.011  | −0.899  | −0.071  |
| Rd                   | −0.101  | 0.422   | 0.105   | 0.877   | −0.005  | −0.029  | −0.087  |
| Rd/Rp                | 0.037   | 0.105   | 0.032   | 0.203   | −0.020  | 0.966   | 0.009   |

Application of this second criterion leaves only three factors, designated as Factor A, Factor B and Factor C, as summarized in Table 4, below. Based on the correlated parameters, these remaining factors are interpreted to reflect size properties, packing, and spatial randomness.

TABLE 4

Factor Analysis Of Subnuclear Organization

| Factor | Common Domain Characteristic | Constituent Parameters | Loadings |
|---|---|---|---|
| A | Size Properties | Mean Domain Size | 0.66 |
|   |                 | Standard Deviation in Domain Size | 0.94 |
|   |                 | Variance in Domain Size | 0.93 |
|   |                 | Skewness in Domain Size | 0.90 |
|   |                 | Kurtosis in Domain Size | 0.90 |
|   |                 | Coefficient of Variation in Domain Size | 0.95 |
|   |                 | Index of Dispersion in Domain Size | 0.97 |
| B | Packing | Mean Domain Nearest Neighbor Distance (Observed), Ro | 0.94 |
|   |         | Median Domain Nearest Neighbor Distance | 0.91 |
|   |         | Domain Density | −0.91 |
|   |         | Mean Domain Nearest Neighbor Distance (Expected), Re | 0.90 |
|   |         | Variance in Domain Nearest Neighbor Distance (Expected), Ve | 0.88 |
| C | Spatial Randomness | Variance in Domain Nearest Neighbor Distance (Observed), Vo | 0.87 |
|   |                    | Standard Deviation in Domain Nearest Neighbor Distance | 0.85 |
|   |                    | Coefficient of Variation in Domain Nearest Neighbor Distance | 0.95 |
|   |                    | Index of Dispersion in Domain Nearest Neighbor Distance | 0.92 |
|   |                    | Vo/Ve | 0.96 |

Figure 13:
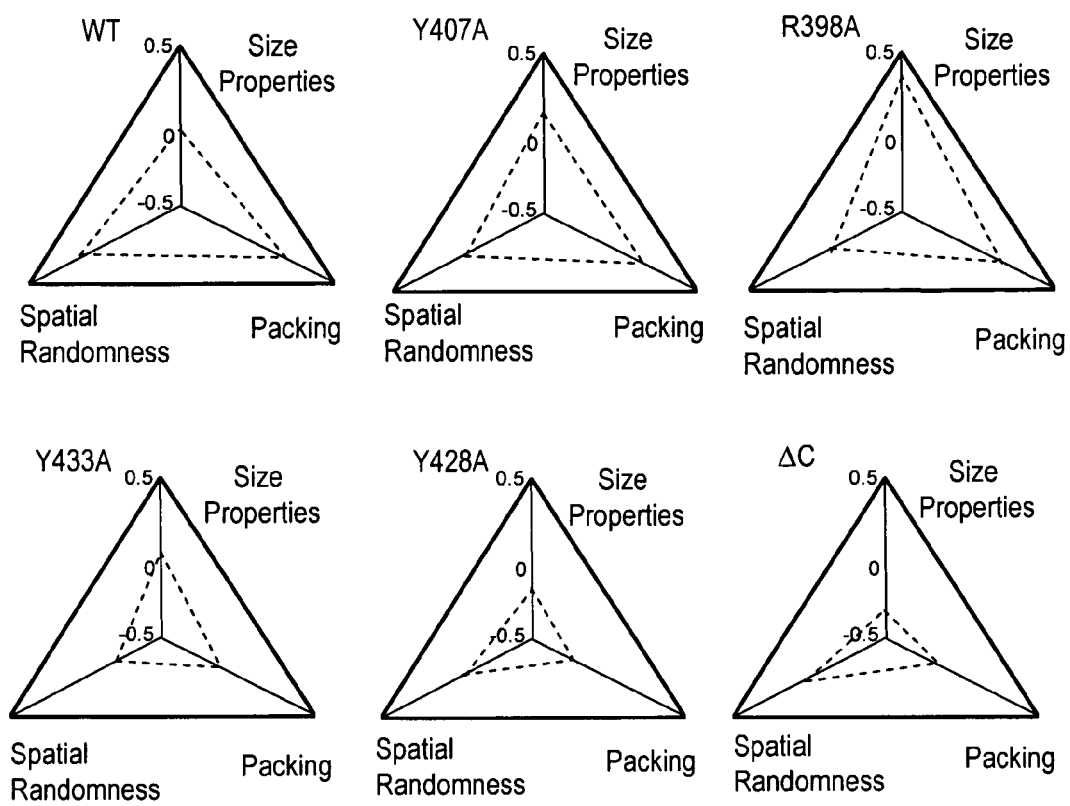
FIG. 13 shows diagrammatic representations of analyses that show the ability of an embodiment of the method of the present invention to discriminate between wild-type Runx2 and NMTS mutants on the basis of three factors related to domain size, packing, and spatial randomness. Factor scores for wild-type and each of the mutants were computed using the data acquired from the 330 nuclear image sections, and presented as star-plots of these scores on three axes, where the center of the star-plot has a value of −0.5, the end of each axis has a value of 0.5, and the mid-point on each axis is zero; these values are in standardized units. Factor scores reflect the sum of standardized subnuclear organization parameters multiplied by respective factor loadings. Factor scores assign a value to each of the calculated Factors (Factor A: Domain Size Properties, Factor B: Domain Packing, and Factor C: Domain Spatial Randomness). Factor scores for each protein define the points of a filled triangle that has been drawn to illustrate the similarities and differences among each of the proteins. Based upon the shape of each of the filled triangles, two groups of domain organizations have been identified: one comprised of the wild-type Runx2 protein along with the Y407A and R398A mutants and a second group containing Y433A, Y428A, and the functionally compromised Runx2-ΔC mutant. Differences in the shape of the triangles highlight the selective alterations in subnuclear organization as a consequence of NMTS mutations.
Figure 14:
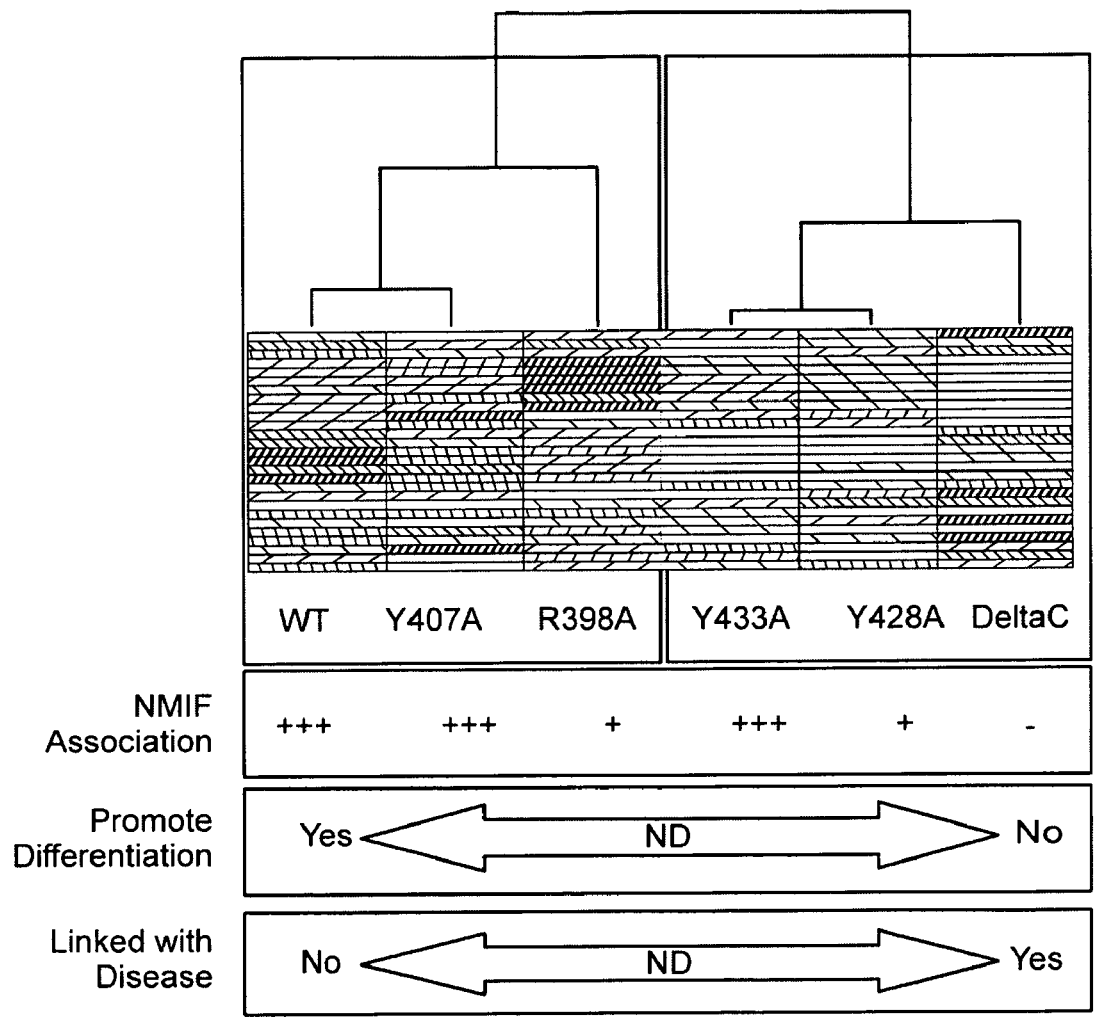
FIG. 14 is a graphic depiction of the results of studies that show that the subnuclear organization of Runx domains is linked with subnuclear targeting, biological function, and disease. The extent to which the subnuclear organization of each mutant differs from wild-type was determined from hierarchical cluster analysis using the Euclidean distance matrix and complete linkage. Cluster organization is illustrated using a dendrogram, and subnuclear organization data is presented in a compressed form as in FIG. 11C and FIG. 12. Two main clusters were observed: one including wild-type and one including the Runx2-ΔC protein, which does not contain the NMTS. The results of this cluster analysis agree with results of the Factor analysis (FIG. 13), particularly with respect to the clustering of Runx2-ΔC with Y433A and Y428A. The extent to which each protein associates with the nuclear matrix as determined by biochemical fractionation and western blot analysis (i.e., ranging for "+++" (associated) for wild-type to "−" (no association for Runx2-ΔC), and the correlation between subnuclear organization and nuclear matrix association is indicated schematically, as is whether a protein will promote differentiation or is involved in disease (i.e., cleidocranial dysplasia).

The results of factor analysis are shown in three-dimensional plots in FIG. 13 and in Table 5, below. FIG. 13 shows diagrammatic representations of analyses that show the ability of an embodiment of the method of the present invention to discriminate between wild-type Runx2 and NMTS mutants on the basis of domain size, packing, and spatial randomness. Factor scores for wild-type and each of the mutants were computed using the data acquired from the 330 nuclear image sections, and presented as star-plots of these scores on three axes, where the center of the star-plot has a value of −0.5, the end of each axis has a value of 0.5, and the mid-point on each axis is zero; these values are in standardized units. Factor scores reflect the sum of standardized subnuclear organization parameters multiplied by respective factor loadings. Factor scores assign a value to each of the calculated Factors (Factor A: Domain Size Properties, Factor B: Domain Packing, and Factor C: Domain Spatial Randomness). Factor scores for each protein define the points of a filled triangle that has been drawn to illustrate the similarities and differences among each of the proteins. Based upon the shape of each of the filled triangles, two groups of domain organizations have been identified: one including the wild-type Runx2 protein along with the Y407A and R398A mutants and a second group containing Y433A, Y428A, and the functionally compromised Runx2-ΔC mutant. Differences in the shape of the triangles highlight the selective alterations in subnuclear organization as a consequence of NMTS mutations.

Based upon the observed differences, the proteins can be categorized into two groups. One group contains wild type Runx2, R398A and Y407A which exhibit similar spatial randomness and domain packing. The second group contains the remaining mutants with similar effects on domain packing, but selective effects on size and spatial randomness. While Y428A and Y433A mutants display similar changes in spatial randomness, domain size alterations are common between the Y428A mutant and the Runx2-ΔC protein. Of all the mutants, the Runx2-ΔC protein has the most prominent effect on the three factors collectively. Notably, this mutant protein exhibits compromised subnuclear targeting, fails to promote osteoblast differentiation, and has been linked to the human disease cleidocranial dysplasia (CCD) (Choi et al., 2001; Zhang et al., 2000). Taken together, the analysis selectively distinguishes between wild-type Runx2 and NMTS mutant proteins based upon the three factors of subnuclear organization.

TABLE 5

Factor Analysis Of Subnuclear Organization

| Genotype | FactorA | FactorB | FactorC |
|---|---|---|---|
| WT    | −0.0133 | 0.2048  | 0.1517  |
| DC    | −0.3724 | −0.1400 | 0.0951  |
| R398A | 0.3747  | 0.1408  | −0.0392 |
| Y407A | 0.1460  | 0.1347  | 0.0399  |
| Y428A | −0.1827 | −0.2288 | −0.0451 |
| Y433A | 0.0477  | −0.1115 | −0.2024 |

FIG. 4 is a graphic depiction of the results of studies that show that the subnuclear organization of Runx domains is linked with subnuclear targeting, biological function, and disease. The extent to which the subnuclear organization of each mutant differs from wild-type was determined from hierarchical cluster analysis using the Euclidean distance matrix and complete linkage. Cluster organization is illustrated using a dendrogram, and subnuclear organization data is presented in a compressed form as in FIG. 11C and FIG. 12G. Two main clusters were observed: one including wild-type and one including the Runx2-ΔC protein, which does not contain the NMTS. The results of this cluster analysis agree with results of the factor analysis (FIG. 13), particularly with respect to the clustering of Runx2-ΔC with Y433A and Y428A. The extent to which each protein associates with the nuclear matrix as determined by biochemical fractionation and western blot analysis (i.e., ranging for "+++" (associated) for wild-type to "−" (no association for Runx2-ΔC), and the correlation between subnuclear organization and nuclear matrix association is indicated schematically, as is whether a protein will promote differentiation or is involved in disease (i.e., cleidocranial dysplasia).

The data and analyses demonstrate that mutations in the NMTS have selective and specific effects on the architectural signature of Runx proteins. Consequently, it is important to comprehensively assimilate all the data to establish the overall degree of domain organizational similarity among wild-type and the mutants. Hierarchical cluster analysis was used to group each protein on the basis of the twenty-five parameters that are used to describe and define their subnuclear organization (FIG. 12G). The dissimilarity between the subnuclear organization of wild-type and the functionally compromised Runx2-ΔC mutant is evident by the presence of two distinct clusters. This mutation removes the entire C-terminus including the subnuclear targeting signal and associated functions; homozygosity for the Runx2-ΔC allele results in embryonic lethality (Choi et al., 2001). The subnuclear organization of Y433A and Y428A mutation was found to be similar to that of the Runx2-ΔC mutant. This observation is in agreement with the factor analysis (FIG. 13) and is consistent with the evidence that these mutant proteins are functionally compromised and are incompetent for integrating physiological signals, which include BMP/TGFβ and Src/YAP signaling (Zaidi et al., 2001; Zaidi et al., 2004). To provide further insight into the Runx nuclear structure-function relationships, the hierarchical cluster arrangement with the intranuclear targeting competency of each protein, as well as their contribution to development and disease were directly compared. This analysis reveals a link between Runx subnuclear domain organization and biological function. The architectural organization of Runx transcription factors within the nucleus is fundamental to their tissue specific regulatory function.

The hierarchical cluster arrangement with the intranuclear targeting competency of each protein was compared along with its contribution to development and disease. This analysis revealed a direct link between Runx subnuclear domain organization and biological function. The architectural organization of Runx transcription factors within the nucleus is fundamental to their tissue specific regulatory function.

Knowledge of the biochemical and genetic components of gene regulation, replication, and repair far exceeds our understanding of the integration of these processes within the context of nuclear architecture. In a preferred embodiment, the method of the present invention provides a bioinformatics approach that is useful to describe and define the organization of protein domains within the nucleus. Intranuclear informatics provides the quantitative platform to capture the relevant parameters of subnuclear organization and to relate these to the fundamental requirements for biological control. Application of the method has demonstrated that the post-mitotic reestablishment of focal subnuclear organization of Runx proteins in progeny cells is functionally conserved, and discriminated between functional and non-functional Runx proteins based, only, upon their domain organization within the nucleus. Furthermore, the method identified a conserved architectural signature of Runx transcription factors that is coupled with fidelity of intranuclear targeting. In a broader context, intranuclear informatics can be applied to analyze subtle alterations in any spatially organized nuclear microenvironments under normal and pathological conditions.

Example 2

An embodiment of the method of the present invention was used to examine the punctate subnuclear distributions of the hematopoietic transcription factor Runx1 and the osteogenic transcription factor Runx2 that are involved in tissue-specific gene expression and that support cell differentiation.

In general, the methods of Example 1 were used, except as discussed below.

Cell Culture and Transfections

Jurkat lymphoma cells were maintained in RPMI with penicillin, streptomycin (PS), 2 mM L-glutamine, and 10% FBS. ROS 17/2.8 osteosarcoma cells were maintained in F12 with PS, 2 mM L-glutamine, and 5% FBS. Hela cells were maintained in DMEM with PS, 2 mM L-glutamine, and 10% FBS. Exponentially growing HeLa cells were transfected using with 500 ng of XPress-tagged wild-type Runx2 and either an HA-tagged C-terminal deletion or one of the five HA tagged NMTS point mutants for 24 hrs with Superfectamine (Invitrogen, San Diego, Calif.).

Immunofluorescence

Hela and Ros cells were grown on gelatin-coated coverslips and Jurkat cells were cytospun directly onto slides coated with Cell-Tak™ (BD Biosciences, Lexington, Ky.). Cells were processed for in situ immunofluorescence as described (Javed, A. et al. J. Cell Sci. 113, 2221-2231 (2000)). In brief, cells were rinsed twice with ice-cold PBS and fixed in 3.7% formaldehyde in PBS for 10 minutes on ice. After rinsing once with PBS, the cells were permeabilized in 0.1% Triton X-100 in PBS, and rinsed twice with PBSA (0.5% bovine serum albumin [BSA] in PBS) followed by antibody staining. Antibodies and their dilutions used are as follows: rabbit polyclonal antibodies against Runx2 (1:200; Oncogene, Carlsbad, Calif.), Runx1 (1:25, Geneka Biotechnology Inc., Montreal, Québec, Canada), HA epitope (1:500, Santa Cruz Biotechnology, Santa Cruz, CA), or mouse monoclonal against Xpress (1:500, Invitrogen, San Diego Calif.). The secondary antibodies used were either anti rabbit or mouse Alexa 568 or Alexa 488 (1:800, Molecular Probes, Eugene, Oreg.).

Image Acquisition and Restoration

Immunostaining of cell preparations was recorded using a CCD camera attached to an epifluorescence Zeiss Axioplan 2 (Zeiss Inc., Thorwood, N.Y.) microscope. For Runx1 and Runx2 interphase/telophase studies single image planes where deconvoluted using the Metamorph Imaging software (Universal Imaging Corp., Downingtown, Pa.). For NMTS mutation experiments Z-series image stacks were acquired at 0.25 micron intervals with 56 nm/pixel (xy). For NMTS studies, statistical tests were conducted to compare among wild-type Runx2 and each of the five mutants. Thirty wild-type and thirty mutant images were analyzed, five of each mutant. As an internal control to assess cell to cell variation, wild-type Runx2 images were obtained within each cell containing a mutant by using secondary antibodies labeled with distinguishable fluorophores. Five images were analyzed per protein within each cell. Restoration of images was carried out by 3-D deconvolution using a measured point-spread function as described in Carrington, W. A. et al. Science 268, 1483-1487 (1995).

Image Processing

The image processing algorithm automatically performs image segmentation, feature extraction, and parameter computation. The input for the algorithm is at least one image pair and a text-file that comprises information such as the names of the images to be analyzed. Each pair of images consists of a digital photomicrograph and a corresponding nuclear mask image. The nuclear mask, generated using Metamorph imaging software or Adobe Photoshop (Adobe Systems, San Jose, Calif.), is used to eliminate intensity data that is located outside the nucleus and restrict analysis to intensity data within the nucleus. A single image plane per cell was analyzed in the mitosis studies. For NMTS mutation studies a single z-section image from deconvoluted stacks of images was analyzed. Image segmentation was carried out using a threshold technique, where the selected threshold is the intensity value that maximizes the number of detectable nuclear domains. The image analysis was implemented using the MATLAB® image processing and statistics toolboxes (The Mathworks Inc., Natick, Mass.) and Metamorph Imaging Software (Universal Imaging Corp., Downingtown, Pa.).

Image Feature Extraction

The image processing algorithm extracts the total number of domains within the nucleus, the size of each domain, the location of each domain-centroid in image pixel coordinates, the nuclear cross-sectional area and the nuclear cross-sectional perimeter from the segmented and mask images. The image processing algorithm determines from these measurements the following statistics for both domain size and nearest neighbor distances: mean, median, variance, standard deviation, index of dispersion, coefficient of variation, skewness, and kurtosis. The index of dispersion and coefficient of variation are mean normalized measures of variation and standard deviation, respectively. Skewness reflects of the degree of asymmetry in the distribution with positive values indicating right skewness and negative values indicating left skewness. Kurtosis is a measure of the peakedness of the distribution: positive values indicate a tall peak and negative values indicate a flat peak (or plateau) (Norman, G. R. Biostatistics: The Bare Essentials. Decker, Inc., Hamilton, Ontario (2000)).

The spatial domain randomness was assessed by measuring Euclidean nearest neighbor distances (NN distances) between domain centroids. The mean and variance of the Euclidean nearest neighbor distances was compared to a Poisson point-process of an equivalent density (i.e., domains per unit nuclear area). Standard error was also calculated measured (Clark, P. J. & Evans, F. C., Ecology 35, 445-453 (1954)). Expected nearest neighbor distance parameters are corrected for edge effects (Sinclair, D. F., Ecology 66, 1084-1085 (1985) and Donnelly, K. P. Simulation studies in archaelogy. Hodder, I. (ed.), pp. 91-95 (Cambridge University Press, London, 1978)). The ratio of observed (Ro) to expected (Re) mean nearest neighbor distances is referred to as the Clark and Evans statistic (Ro/Re<1, clustered; Ro/Re=1, random; Ro/Re>1, ordered) (Clark, P. J. & Evans, F. C. Distance to nearest neighbor as a measure of spatial relationships in populations. Ecology 35, 445-453 (1954)).

The radial position of domains within the nucleus was determined by measuring the mean distance from each domain centroid to the nuclear centroid (mean domain radius) and the mean distance from the nuclear centroid position to the each perimeter pixel (mean perimeter radius); for a circle this would be the radius. The ratio of the two values is the mean relative domain radius. Values between 0 and 0.5 reflect a tendency for domains to be positioned in the nuclear interior and values between 0.5 and 1 reflect a tendency for domains to be positioned toward the nuclear periphery.

Statistical Analyses

ANOVA and Kruskal-Wallis tests were conducted on subnuclear organization data to determine the significance of observed differences in each parameter. Asterisks indicate parameters with differences that are considered to be statistically significant on a 0.05 level. P-values were adjusted to account for the false-discovery rate; asterisks are indicative of this adjustment. Analysis was performed using the GLM and multest procedures in SAS/STAT (SAS Institute Inc., Cary, N.C.). For mitosis studies these statistical tests were conducted to compare among telophase nuclei ($T_1$ and $T_2$) and interphase (I). Twenty-one nuclei were analyzed for Runx1: nine for each telophase nucleus and three interphase nuclei. Sixty nuclei were analyzed for Runx2: twenty for each nucleus.

For NMTS studies, statistical tests were conducted to compare among wild-type Runx2 and each of the five mutants. Thirty wild-type and thirty mutant images were analyzed, five of each mutant. Wild-type Runx2 images were obtained within each cell containing a mutant. Five images were analyzed per protein within each cell.

Factor Analysis was performed on parameters of subnuclear organization for each of the wild-type Runx and the six mutant proteins. This analysis represents the observed subnuclear organization parameters in terms of a smaller number of uncorrelated "factors" (or groups of parameters) that describe most of the variation in the data.

Factors are extracted using principal component analysis and rotated using the varimax method. Factors scores were computed for each image and represent the sum of the standardized subnuclear organization parameters multiplied by their respective Factor loadings. Factor loading refers to the correlation of each subnuclear organization parameter with a particular Factor. This analysis was carried out using the Factor procedure in SAS/STAT.

Hierarchical cluster analysis was performed on mean subnuclear organization parameters from wild-type Runx and the six mutant proteins. Cluster analysis was performed using the Euclidean distance metric with complete linkage. Clusters were displayed using a dendrogram. Cluster analysis was carried out using the cluster procedure in SAS/STAT.

FIGS. 6A-6E are graphic depictions of the results of studies that show that the post-mitotic restoration of the spatially ordered subnuclear organization is functionally conserved for the hematopoietic transcription factor Runx1 and the osteogenic transcription factor Runx2. Jurkat lymphoma cells (Runx1) or ROS 17/2.8 osteosarcoma cells (Runx2) were immunostained in situ using a specific primary antibody specific for either endogenous Runx1 or Runx2, labeled using a fluorophore-tagged secondary antibody and visualized using microscopy. Both Runx1 and Runx2 were distributed at punctate subnuclear domains throughout the interphase and telophase nucleus. Subnuclear organization parameters were computed from deconvoluted images for both Runx1 and Runx2 for interphase nuclei, (I) and both progeny telophase nuclei, denoted at random as telophase nucleus 1, ($T_1$) or telophase nucleus 2, ($T_2$). Both Runx1 and Runx2 were distributed at punctate subnuclear domains throughout the interphase and telophase nucleus (outer left and right panels). Subnuclear organization parameters were computed from deconvoluted images for both Runx1 and Runx2 for interphase nuclei, (I) and both progeny telophase nuclei, denoted at random as telophase nucleus 1, ($T_1$) or telophase nucleus 2, ($T_2$). Images of twenty-one nuclei immunostained for Runx1 were analyzed: nine of each telophase nucleus and three interphase nuclei. Images of thirty nuclei immunostained for Runx2 were analyzed: ten each for each category ($T_1$, $T_2$, and I) of nucleus. ANOVA was performed to assess the significance of observed differences between $T_1$, $T_2$, and I. Overall mean Clark and Evans statistics (Ro/Re) were ~1.4 for both endogenous Runx1 as well as Runx2, indicating a non-random organization with spatial order.

FIGS. 6A and 6B are reversed contrast grayscale images of fluorescence photomicrographs of interphase (FIG. 6A) and telophase (FIG. 6B) nuclei. Jurkat lymphoma cells were immunostained using a primary antibody specific for endogenous Runx1 and a secondary antibody labeled with an Alexa fluorophore. Digital images were acquired using a CCD camera coupled to a fluorescence microscope. Single image planes were deconvoluted and processed using an embodiment of the method of the present invention. Runx1 immunoreactivity was found to be distributed in punctate subnuclear domains that were distributed throughout the interphase and telophase nucleus. Black scale bar indicates 10 μm.

FIGS. 6C and 6D are reversed contrast grayscale images of fluorescence photomicrographs of interphase (FIG. 6C) and telophase (FIG. 6D) nuclei. ROS 17/2.8 osteosarcoma cells were immunostained using a primary antibody specific for endogenous Runx2 and a secondary antibody labeled with an Alexa fluorophore. Digital images were acquired using a CCD camera coupled to a fluorescence microscope. Single image planes were deconvoluted and processed using an embodiment of the method of the present invention. Runx2 immunoreactivity was found to be distributed in punctate subnuclear domains that were distributed throughout the interphase and telophase nucleus. Black scale bar indicates 10 μm.

FIG. 6E is a diagrammatic representation of the results of analysis using an embodiment of the method of the present invention. Subnuclear organization parameters were computed from deconvoluted images of interphase nuclei, (I) and both progeny telophase nuclei, denoted at random as telophase nucleus 1, ($T_1$) or telophase nucleus 2, ($T_2$) immunostained for either Runx1 or Runx2. ANOVA was performed to assess the significance of observed differences between $T_1$, $T_2$, and I. Asterisks indicate statistically significant differences based on a 0.05 level with correction for false discovery rate. Bonferroni's multiple comparison tests were use to determine which nuclei differed significantly at a P=0.05 level. Significant differences were observed between each telophase ($T_1$,$T_2$) and interphase nuclei (I) for each protein, but differences were not observed between telophase nuclei.

Mutation of the conserved C-terminal nuclear matrix targeting signal (NMTS) alters the interphase Runx2 subnuclear organization. FIGS. 7A-7G are graphic depictions of the results of studies that demonstrate differences in the extent and nature of these alterations in subnuclear organization when NMTS mutant proteins are co-expressed in the same cell as wild-type Runx2 proteins. Point mutations within the Runx2 NMTS were generated using PCR-mediated mutagenesis. Deconvoluted images were analyzed of whole cells (HeLa) expressing either XPress-tagged wild-type Runx2, an HA-tagged C-terminal deletion (SC), or one of the five HA-tagged NMTS point mutants.

Figure 7A:
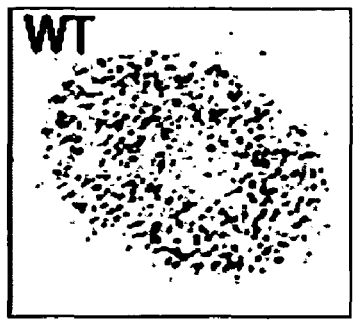
FIGS. 7A-7I are graphic depictions of the results of studies that show that the mutation of the conserved C-terminal nuclear matrix targeting signal (NMTS) alters the interphase Runx2 subnuclear organization. Point mutations within the Runx2 NMTS were generated using PCR-mediated mutagenesis. Deconvoluted images were analyzed of whole cells (HeLa) expressing either Xpress-tagged wild-type Runx2, an HA-tagged C-terminal deletion (ΔC), or one of the five HA-tagged NMTS point mutants.
Figure 7C:
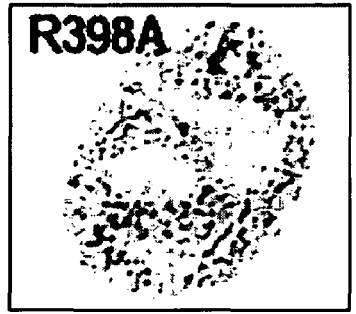
Figure 7E:
Figure 7G:
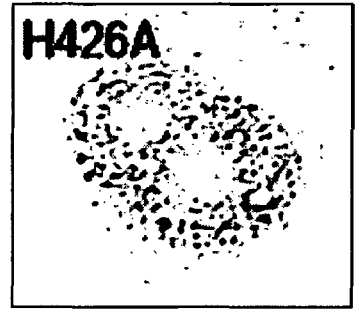
Figure 7B:
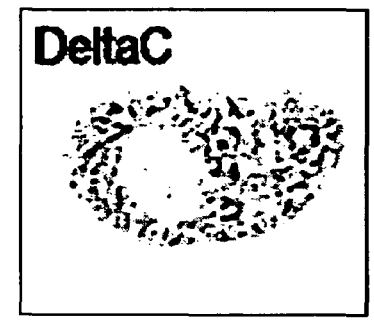
Figure 7D:
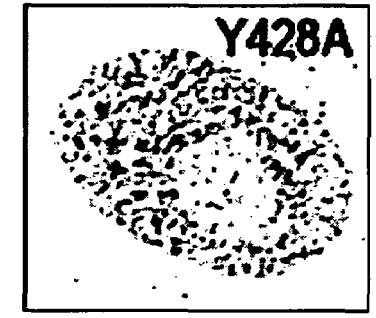
Figure 7F:
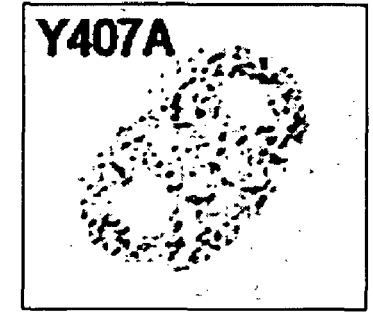

FIGS. 7A-7G are reversed contrast grayscale images of fluorescence photomicrographs of the nuclei of HeLa cells that were immunostained in situ using a primary antibody specific for endogenous Runx2 and a secondary antibody labeled with an Alexa fluorophore. Digital images were acquired using a CCD camera coupled to a fluorescence microscope. For NMTS mutation studies Z-series image stacks were acquired at 0.25 micron intervals with 67 nm/pixel (xy) resolution. Single image planes were deconvoluted and processed using an embodiment of the method of the present invention. Images show punctate subnuclear distributions for wild-type Runx2 (FIGS. 4-47A), an HA-tagged C-terminal deletion (ΔC, FIG. 7B), mutant R398A (FIG. 7C), mutant Y428A (FIG. 7D), mutant Y433A (FIG. 7E), mutant Y407A (FIG. 7F) and mutant H426A (FIG. 7G). The black scale bar indicates 10 μm.

Figure 7H:
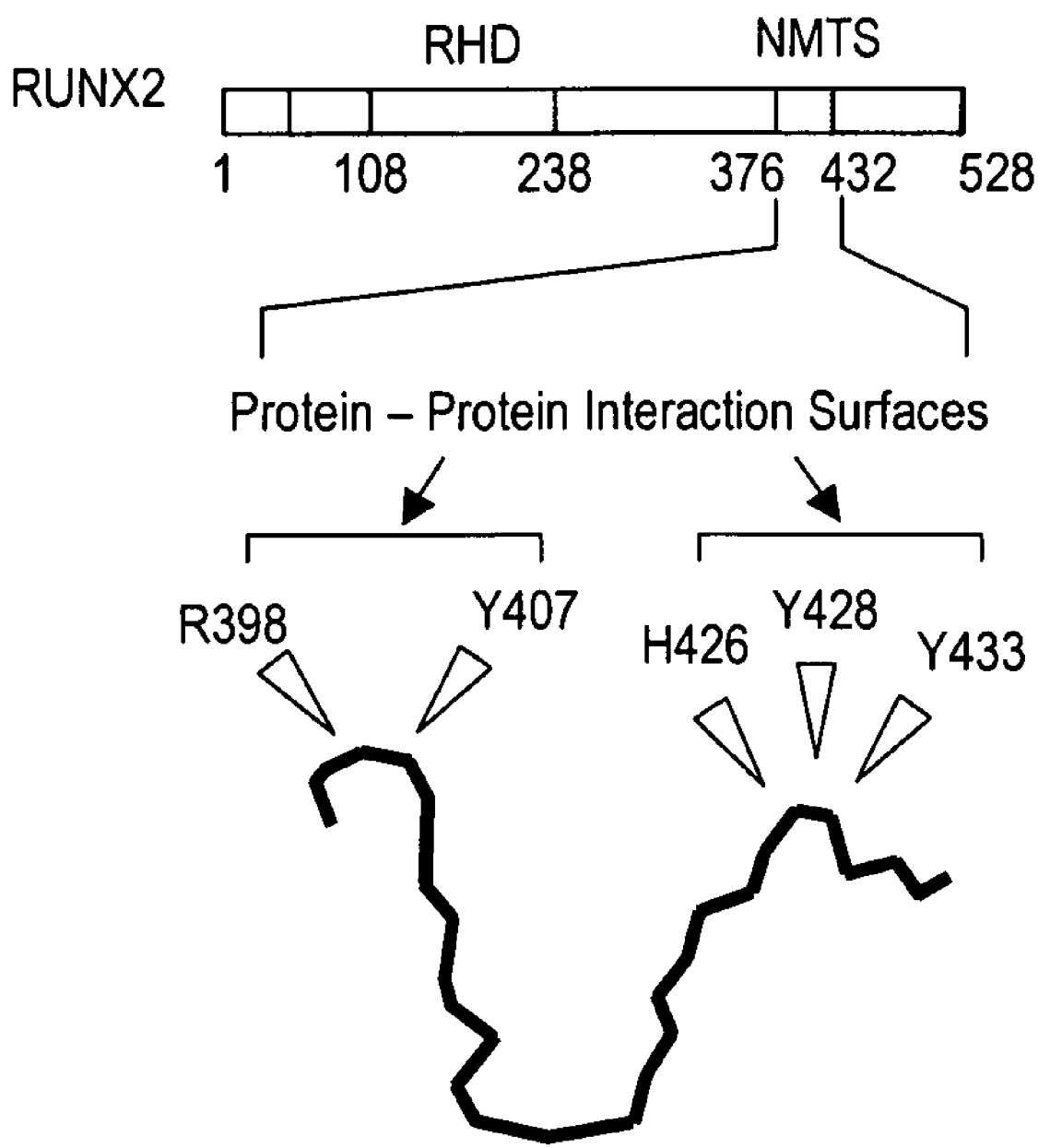

FIG. 7H is a diagrammatic representation of the position of the NMTS mutations in the C-terminal region where the locations of the mutations are shown schematically superimposed on the NMTS crystal structure.

Figure 7I:
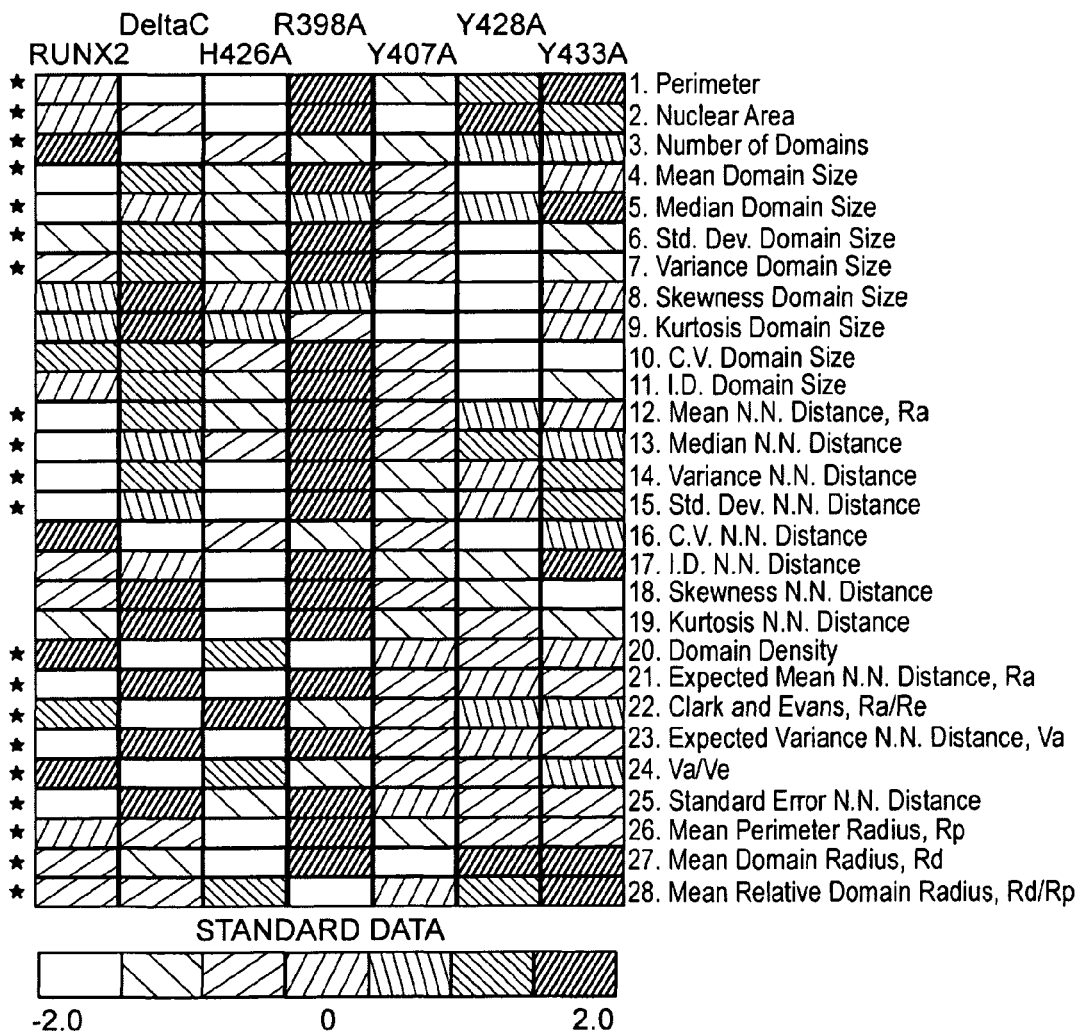

FIG. 7I is a diagrammatic representation of the results of analysis using an embodiment of the method of the present invention. Using a repeated-measure analysis of variance (ANOVA), significant differences were detected at the P=0.05 level in 17 of 25 parameters measured, as indicated by asterisks.

Factor analysis was performed as described above, and three factors (Table 4), as well as selected parameters, were used to compare the distributions of the wild-type Runx2 protein to those of the deletion and substitution mutant proteins. FIGS. 8A-8D are graphical representations of the differences among the wild-type and mutant proteins.

Figure 9A:
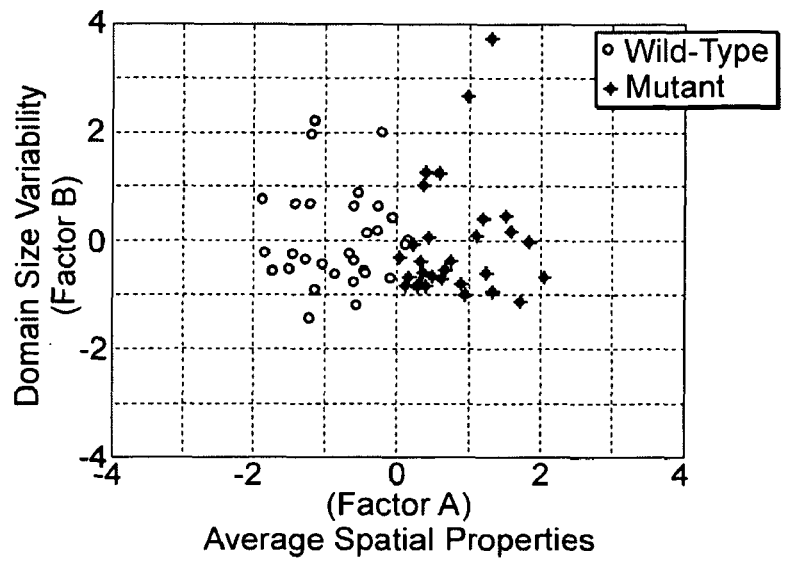
FIG. 9A-9C are two dimensional scatter plots showing pairwise comparisons of factors to identify differences between the distributions of the wild-type Runx2 protein (open circles) to those of the deletion and substitution mutant proteins (crosses, +). Factor scores were computed for each of three factors: Factor A, average spatial properties; Factor B, domain size variability; and Factor C, domain nearest neighbor distance variability. The analysis revealed that the greatest separation between clusters is on the dimension of Factor A, indicating that the largest differences between mutants and wild-type are on parameters describing the number of domains, the average domain size, and the spatial randomness of domains (FIGS. 9A and 9B). The scatter plots of wild-type and mutant proteins overlap on the dimensions of Factor B, domain size variability; and Factor C, domain nearest neighbor distance variability (FIG. 9C). These results show that there are distinct differences in spatial organization between the wild-type and mutant proteins than can be detected by comparison of factor scores.
Figure 9B:
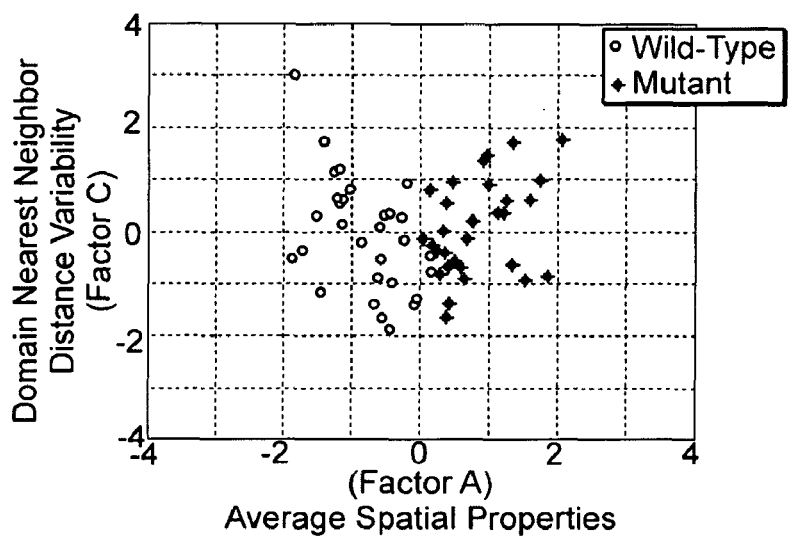
Figure 9C:
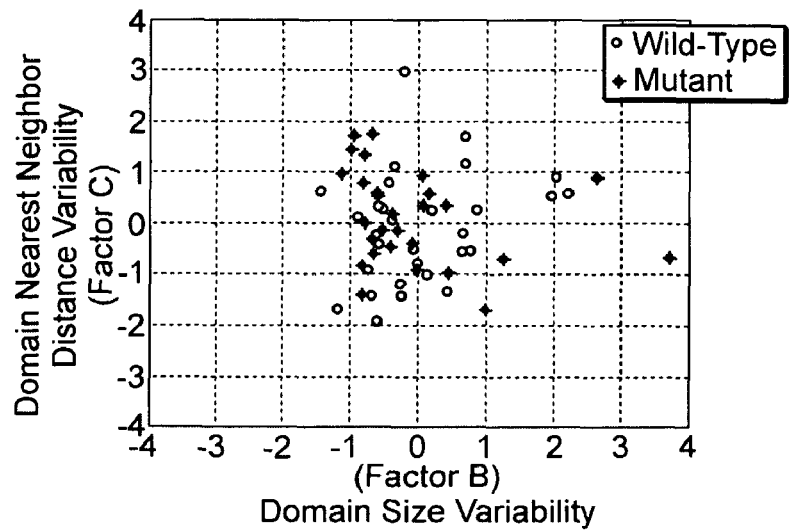

The differences between the distributions of the wild-type Runx2 protein and the deletion and substitution mutant proteins can also be seen in comparisons of factor scores. FIGS. 9A-9C are two dimensional scatter plots showing pairwise comparisons of factor scores to identify differences between the distributions of the wild-type Runx2 protein (open circles) to those of the deletion and substitution mutant proteins (crosses, +). Factor scores were computed for each of three factors: Factor A, average spatial properties; Factor B, domain size variability; and Factor C, domain nearest neighbor distance variability. The analysis revealed that the greatest separation between clusters is on the dimension of Factor A, indicating that the largest differences between mutants and wild-type are on parameters describing the number of domains, the average domain size, and the spatial randomness of domains (FIGS. 9A and 9B). The scatter plots of wild-type and mutant proteins overlap on the dimensions of Factor B, domain size variability; and Factor C, domain nearest neighbor distance variability. These results show that there are distinct differences in spatial organization between the wild-type and mutant proteins and that these differences can be detected by comparison of factor scores. In this case, a single Factor that represents the average spatial properties shows dramatic difference. As noted above, significant factors can be identified by the method of the present invention.

Figure 8A:
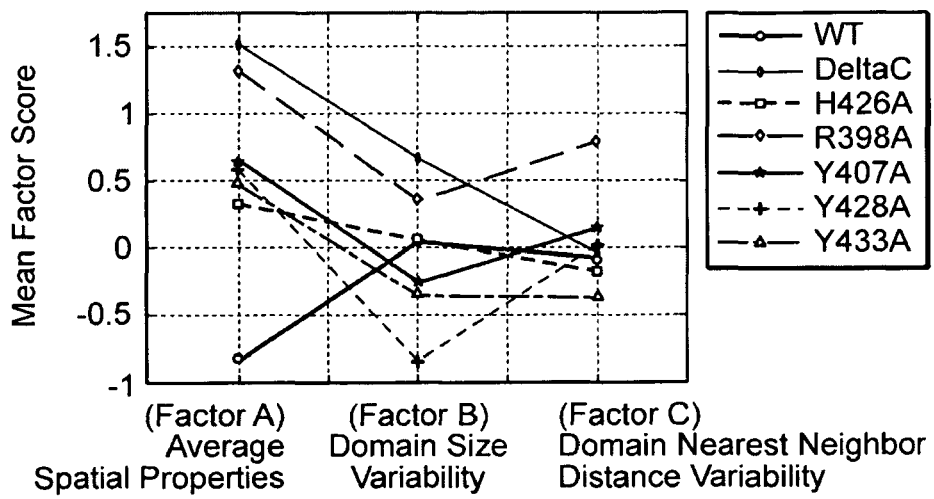
FIGS. 8A-8D are graphical representations of the differences in factors that describe the average spatial properties, domain size variability, and domain nearest neighbor distance variability of the wild-type and mutant proteins.

FIG. 8A is a two-dimensional line plot of the average factor scores measured on each of the mutants individually and wild-type. Based on Factor A (average spatial properties), there are two groups of mutants that differ from wild-type: one composed of Runx2-ΔC and the R398A mutant protein, and a second composed of the remaining mutants. Based on Factor B (domain size variability), there are three groups: one of Y428A alone, a second of R398A and Runx2-ΔC, and a third of wild-type Runx2 and the remaining mutants. Based on Factor C (nearest neighbor distance variability), the R398A mutant alone is higher than the wild-type and the remaining mutants. When all Factors are considered, the R398A mutant protein and Runx2-ΔC differ most prominently from wild-type, followed by Y428A.

Figure 8B:
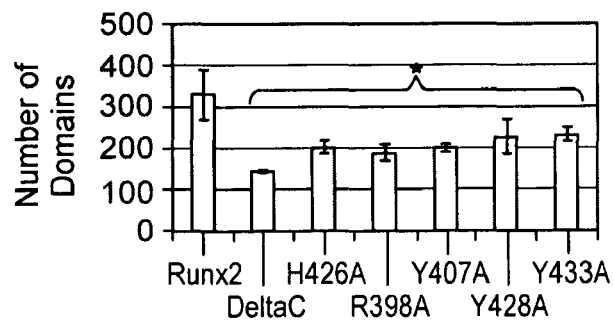
Figure 8C:
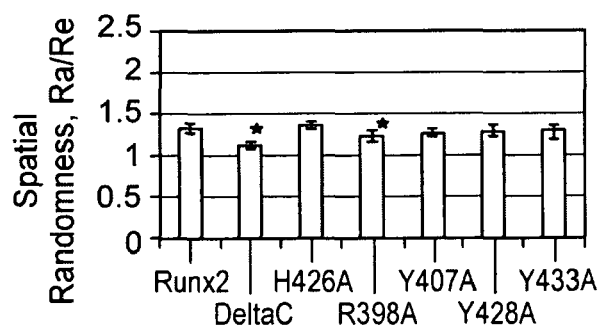
Figure 8D:
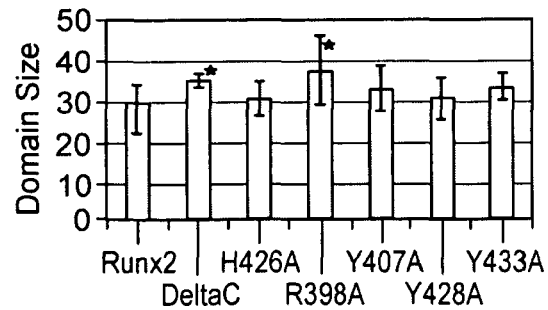

FIGS. 8B-8D shows graphically the comparison of three parameters: number of domains (FIG. 8B), domain spatial randomness (FIG. 8C), and the size of domains (FIG. 8D) for each of the mutants and wild-type Runx2. ANOVA revealed that the observed differences were statistically significant on a 0.05 level. Bonferroni's multiple comparison test (0.05 level) was used to determine which means differed significantly from wild-type as indicated by asterisks. FIG. 8A shows that all mutants have significantly fewer domains than wild-type protein. However, the wild-type Runx2 protein and most of the NMTS mutant proteins showed a comparable non-random distribution with spatial order (FIG. 8C) and similar domain size (FIG. 8D). Both R398A and Runx2-ΔC are exceptions, exhibiting on average larger domains (FIG. 8D) and a more random spatial distribution (FIG. 8C) than the wild-type Runx2 protein.

Figure 10:
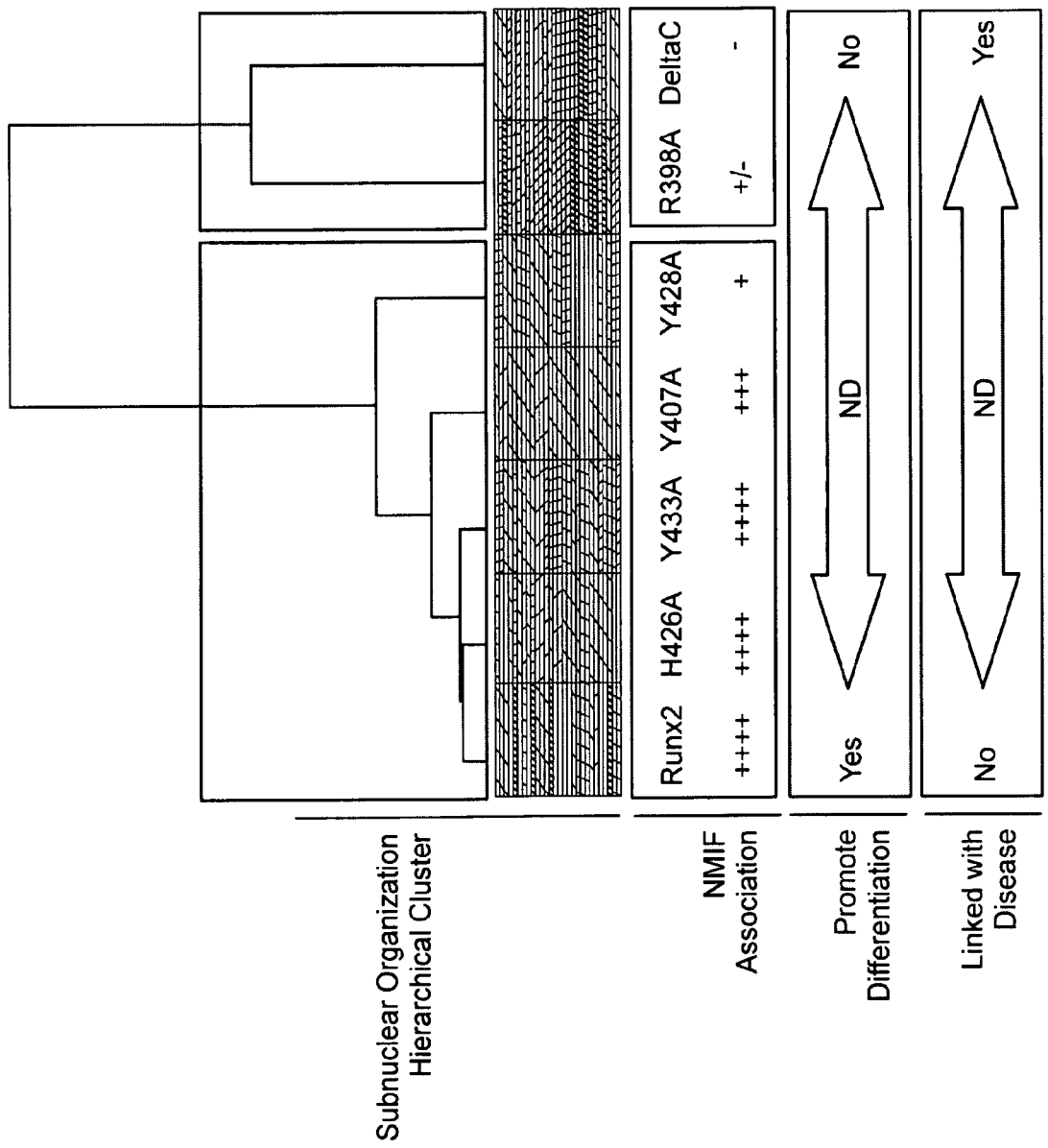
FIG. 10 is a diagrammatic representation of the results of hierarchical cluster analysis using the Euclidean distance matrix and complete linkage that was performed to determine the extent to which the subnuclear organization of each mutant protein differs from that of the wild-type Runx2 protein. In these studies each mutant protein is expressed in the same cell as wild-type protein.

Another form of analysis confirmed the results of the factor analysis. FIG. 10 is a diagrammatic representation of the results of hierarchical cluster analysis using the Euclidean distance matrix and complete linkage that was performed to determine the extent to which the subnuclear organization of each mutant protein differs from that of the wild-type Runx2 protein. In FIG. 10, cluster organization is illustrated using a dendrogram. Subnuclear organization data is presented in a compressed form with a color map as described in FIG. 6E. Shown at the bottom of the dendrogram is a symbolic representation of the extent to which each protein associates with the nuclear matrix as determined by biochemical fractionation and western blot analysis (i.e., ranging for "++++" (associated) for wild-type to "−" (no association for Runx2-ΔC). The schematic below indicates whether a protein will promote differentiation or is involved in disease, scored as "yes", "no", or "ND" (not determined).

The cluster analysis indicated that there were two main groups: one including the wild-type Runx2 protein and the substitution mutants H246A, Y433A, Y407A and Y428A, and another including the Runx2-ΔC protein that does not include the NMTS and the substitution mutant R398A. This result from the cluster analysis is consistent with that of the factor analysis described above within example 2, particularly with respect to the clustering of Runx2-ΔC with R398A. This consistency lends strength to the observed groupings.

Example 3

Figure 15A:
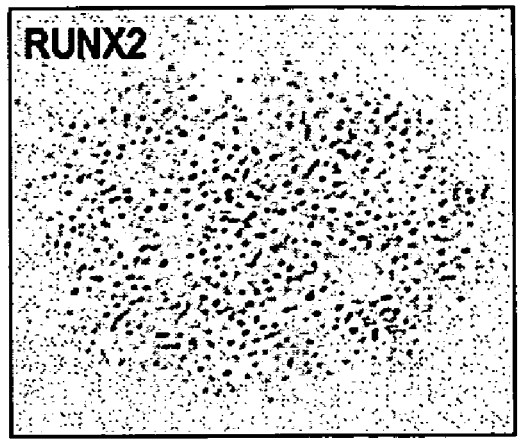
FIGS. 15A-15C are reversed contrast grayscale images of fluorescence photomicrographs of nuclei of HeLa cells that were immunostained in situ using an appropriate specific primary antibody and a secondary antibody labeled with a fluorophore, showing punctate subnuclear distributions for wild-type Runx2 protein (FIG. 15A), RNA polymerase II (FIG. 15B) and SC35 (FIG. 15C).
Figure 15B:
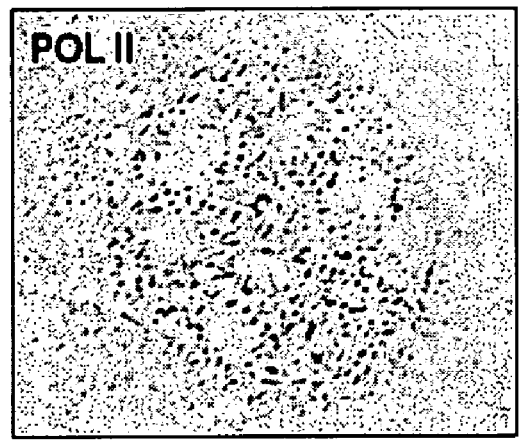
Figure 15C:
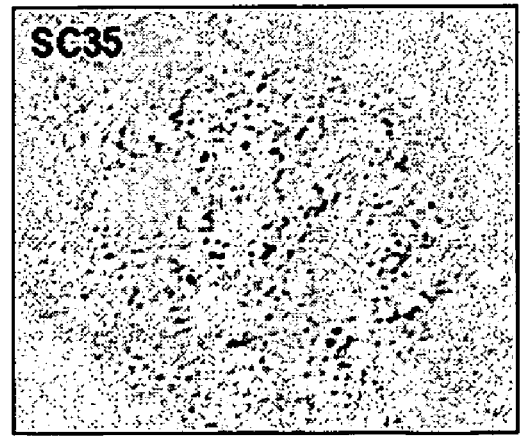

The intranuclear informatics method of the present invention is useful for classifying nuclear proteins based on the quantitative analysis of subnuclear organization. The incorporation of discriminant analysis in the method of the present invention provides a basis for classification that is useful for research, e.g., the distribution of known and putative transcription factors and their interactions in the control of gene expression. The resulting classification also has diagnostic and prognostic uses, particularly when the protein organization can be related to cell function or disease state This example examines the subnuclear organization of three different nuclear proteins: the RNA processing factor SC35 (n=50), RNA polymerase II (n=50), and the lineage-specific transcription factor Runx2 (n=75). Typical images are shown in FIGS. 15A-15C. FIGS. 15A-15C are reversed contrast grayscale images of fluorescence photomicrographs of nuclei of HeLa cells that were immunostained in situ using an appropriate specific primary antibody and a secondary antibody labeled with a fluorophore, showing punctate subnuclear distributions for wild-type Runx2 protein (FIG. 15A), RNA polymerase II (FIG. 15B) and SC35 (FIG. 15C). Mean subnuclear organization parameters are provided in Table 6, below.

TABLE 6

Subnuclear Organization Parameters

| Subnuclear Organization Parameter | Runx2 | RNA Pol II | SC35 |
| --- | --- | --- | --- |
| Number of domains | 490.453 | 377.080 | 397.440 |
| Mean domain size | 31.747 | 29.430 | 34.272 |
| Median domain size | 23.093 | 17.580 | 16.640 |
| Stdev domain size | 34.726 | 37.836 | 53.401 |
| Variance domain size | 1325.946 | 1713.191 | 3068.942 |
| Skewness domain size | 2.706 | 3.218 | 3.606 |
| Kurtosis domain size | 15.382 | 20.316 | 21.111 |
| CV domain size | 1.078 | 1.248 | 1.535 |

TABLE 6-continued

Subnuclear Organization Parameters

| Subnuclear Organization Parameter | Runx2 | RNA Pol II | SC35 |
| --- | --- | --- | --- |
| ID domain size | 39.142 | 51.408 | 84.870 |
| Mean NN Distance | 8.427 | 8.851 | 8.805 |
| Median NN Distance | 8.320 | 8.619 | 8.601 |
| Variance NN Distance | 4.813 | 5.365 | 5.955 |
| Stdev NN Distance | 2.186 | 2.309 | 2.432 |
| CV NN Distance | 0.260 | 0.261 | 0.277 |
| ID NN Distance | 0.573 | 0.606 | 0.678 |
| Skewness NN Distance | 0.376 | 0.817 | 0.603 |
| Kurtosis NN Distance | 3.794 | 5.231 | 4.363 |
| Domains Density | 0.007 | 0.006 | 0.006 |
| Re | 6.066 | 6.668 | 6.632 |
| Ro/Re | 1.389 | 1.328 | 1.330 |
| Ve | 10.972 | 13.341 | 13.222 |
| Vo/Ve | 0.440 | 0.402 | 0.452 |
| Rp | 164.741 | 160.439 | 164.075 |
| Rf | 100.212 | 96.850 | 98.060 |
| Rf/Rp | 0.612 | 0.608 | 0.599 |

These subnuclear organization data were used to generate a discriminant criterion to classify an image as SC35, RNA Polymerase II, or Runx2 using three different methods: linear discriminant function, quadratic discriminant function, and nearest-neighbors. The choice of one or another method was based on certain assumptions regarding the distribution of the data. Linear and quadratic functions assume that the underlying distribution is multivariate normal but differ in assumptions regarding the within-group covariances. The nearest-neighbor approach makes no assumptions of normality regarding the underlying distribution (Johnson R A and Wichern D W, Applied Multivariate Statistical Analysis, Prentice Hall, Fifth Edition, Chapter 11, 2002). In practice it is useful to establish the performance of each method.

To assess the quality of the subnuclear organization based discriminant criterion and the feasibility of the general concept, each protein immunoreactivity distribution image was classified using a cross-validation method. In the cross-validation scheme each image in the set is classified using a discriminant function that is computed from all of the other observations (images). After all images have been classified, a classification rate is computed to establish the success of the model. Classification rate reflects the percentage of correct classifications. Results of this analysis are shown below. Priors reflect the proportion of each protein image relative to the total number of images (e.g., 75/175=0.4286). The comparison of methods showed that linear and quadratic methods perform similarly well and that the nearest neighbor method, which correctly classifies protein images at rates above 90%, has the greatest performance.

TABLE 7

Classification Using Linear Discriminant Function (Crossvalidation)

| Protein | Number of Images Analyzed | Classification | | | Classification Rate |
| --- | --- | --- | --- | --- | --- |
| | | Runx2 | RNA Polymerase II | SC35 | |
| Runx2 | 75 | 70 | 1 | 4 | 93.3% |
| RNA Polymerase II | 50 | 1 | 42 | 7 | 84.0% |
| SC35 | 50 | 5 | 1 | 44 | 88.0% |
| Priors | | 0.4286 | 0.2857 | 0.2857 | |

TABLE 8

Classification Using Quadratic Discriminant Function (Crossvalidation)

| Protein | Number of Images Analyzed | Classification Runx2 | Classification RNA Polymerase II | Classification SC35 | Classification Rate |
|---|---|---|---|---|---|
| Runx2 | 75 | 73 | 2 | 0 | 97.3% |
| RNA Polymerase II | 50 | 5 | 40 | 5 | 80.0% |
| SC35 | 50 | 4 | 3 | 43 | 86.0% |
| Priors | | 0.4286 | 0.2857 | 0.2857 | |

TABLE 9

Classification Using Nearest Neighbors, k = 10 (Crossvalidation)

| Protein | Number of Images Analyzed | Classification Runx2 | Classification RNA Polymerase II | Classification SC35 | Classification Rate |
|---|---|---|---|---|---|
| Runx2 | 75 | 69 | 6 | 0 | 92.0% |
| RNA Polymerase II | 50 | 0 | 50 | 0 | 100.0% |
| SC35 | 50 | 0 | 3 | 47 | 94.0% |
| Priors | | 0.4286 | 0.2857 | 0.2857 | |

These results demonstrate the usefulness of discriminant criteria based on subnuclear organization as a basis for classification of nuclear proteins. In this example, a reclassification approach was to validate the general concept. In practice, a discriminant criterion for multiple classification groups can be established and applied to future observations.

In one example, the method can be applied for the classification of cells which have a propensity for acute myeloid leukemia. The chromosomal translocation between the ETO gene on chromosomes 8 and the RUNX1 gene on chromosome 21 generates a fusion protein containing the N-terminal and DNA binding domain of the Runx1 (AML1/cbfa2) protein and the C-terminal portion of the Eto (MTG8) protein. This fusion protein, identified as AML-ETO, causes a block in differentiation due to the dysregulation of Runx1 target genes and is implicated in acute myeloid leukemias of several classes (Nimer S D and Moore M A. Effects of the leukemia-associated AML1-ETO protein on hematopoietic stem and progenitor cells. Oncogene. 2004 May 24; 23(24):4249-54; Peterson L F, and Zhang D E. The 8;21 translocation in leukemogenesis. Oncogene. 2004 May 24; 23(24):4255-62). It has been shown that the AML-ETO fusion protein is targeted to domains within the nucleus that contain the ETO protein and not to domains that contain the AML proteins (Meyers S, Hiebert S W. Alterations in subnuclear trafficking of nuclear regulatory factors in acute leukemia. J Cell Biochem Suppl. 2000; Suppl 35:93-8; McNeil, S., The t(8;21) chromosomal translocation in acute myelogenous leukemia modifies intranuclear targeting of the AML1/CBFalpha2 transcription factor. Proc Natl Acad Sci USA. 1999 Dec. 21; 96(26):14882-7). This finding indicates that the subnuclear organization of the AML-ETO fusion protein is different that of the Runx1 (AML1/cbfa2) protein. Several antibodies are commercially available that recognize the Runx1 protein and AML-ETO protein that are suitable for immunofluorescent staining followed by digital fluorescence microscopy. Thus, preferred embodiments of the method of the present invention using discriminant criteria based on subnuclear organization can be used as a tool for diagnostic classification of acute myeloid leukemia.

There are other examples of translocation fusion proteins whose subnuclear organization could be exploited for diagnostic purposes, e.g., PML-RAR alpha fusion protein, AML1-EVI1 fusion protein, and ALL fusion proteins (See Puccetti E, Ruthardt M. Acute promyelocytic leukemia: PML/RAR alpha and the leukemic stem cell. Leukemia. 2004 July; 18(7):1169-75; Mitani K., Molecular mechanisms of leukemogenesis by AML1/EVI-1. Oncogene. 2004 May 24; 23(24):4263-9; Canaani, E., et al., ALL-1/MLL1, a homologue of Drosophila TRITHORAX, modifies chromatin and is directly involved in infant acute leukaemia. Br J. Cancer. 2004 Feb. 23; 90(4):756-60).

In other embodiments, the method of classification of the present invention can be used for the classification of targets of human autoimmune sera, which include examples described in, e.g., Imai, H., et al., Autoantibodies in viral hepatitis-related hepatocellular carcinoma. Intervirology. 1993;35(1-4):73-8; Mosgoeller, W., et al, Nuclear architecture and ultrastructural distribution of poly(ADP-ribosyl) transferase, a multifunctional enzyme. J Cell Sci. 1996 February; 109 (Pt 2):409-18.; Ochs, R. L., et al., cDNA cloning and characterization of a novel nucleolar protein. Mol Biol Cell. 1996 July; 7(7):1015-24; Valdez, B. C., et al., A nucleolar RNA helicase recognized by autoimmune antibodies from a patient with watermelon stomach disease. Nucleic Acids Res. 1996 Apr. 1; 24(7):1220-4; Bolivar, J., et al., The fragile-X-related gene FXR1 is a human autoantigen processed during apoptosis. J Biol Chem. 1998 Jul. 3; 273(27): 17122-7; Chai, Z., et al., SET-related cell division autoantigen-1 (CDA1) arrests cell growth. J Biol Chem. 2001 Sep. 7; 276(36):33665-74. Epub 2001 Jun. 6.; Scofield R H. Autoantibodies as predictors of disease. Lancet. 2004 May 8; 363 (9420):1544-6. Discriminant criteria based on subnuclear organization produced by preferred embodiments of the present invention can be used for classification of the targets of the autoimmune sera, correlation with function and can provide a means for the diagnosis of disease states.

The claims should not be read as limited to the described order or elements unless stated to that effect. Therefore, all embodiments that come within the scope and spirit of the following claims and equivalents thereto are claimed as the invention.

What is claimed:

1. A method for quantifying domains within a punctate distribution comprising the steps of:
   acquiring at least one digital image of a punctate distribution, wherein the at least one digital image is a fluorescence photomicrographic image of the nucleus of a eukaryotic cell;
   performing image segmentation on the at least one digital image to produce a segmented image of the punctate distribution;
   identifying domains within the punctate distribution of the segmented image; and
   computing at least twenty-five organizational parameters of the domains within the punctate distribution of the segmented image wherein the at least 25 organizational parameters comprise the number of domains, mean domain size, median domain size, standard deviation of domain size, variance of domain size, skewness of domain size, kurtosis of domain size, coefficient of variation of domain size; index of dispersion of domain size; mean nearest neighbor distance, median nearest neighbor distance, standard deviation of nearest neighbor distance, variance of nearest neighbor distance, skewness of nearest neighbor distance, kurtosis of nearest neighbor distance, coefficient of variation of nearest neighbor distance; index of dispersion of nearest neighbor distance, domain density, Re, Ro/Re, Ve, Vo/Ve, Rp, Rd, or Rd/Rp.

2. The method of claim 1, wherein the step of acquiring digital images further comprises the step of deconvoluting the digital image.

3. The method of claim 1 wherein the step of identifying domains further comprises the step of providing a mask of a portion of the digital image.

4. The method of claim 1 wherein the step of identifying domains further comprises the step of producing a masked image.

5. The method of claim 1 wherein the step of performing image segmentation further comprises the step of determining an image threshold.

6. The method of claim 1 wherein the step of performing image segmentation further comprises the step of selecting a threshold that maximizes the number of detectable domains in the segmented image.

7. The method of claim 1 further comprising the step of performing factor analysis on the organizational parameters.

8. The method of claim 1, further comprising performing statistical analysis of organizational parameters.

9. The method of claim 1, wherein the statistical analysis is selected from discriminant analysis, cluster analysis, classification analysis, analysis of variance, a Kruskal-Wallis test, and a multiple-comparison test.

10. The method of claim 1, wherein the at least 25 organizational parameters are selected from parameters that describe (i) domain quantity and nuclear size, (ii) domain size and variability, (iii) domain spatial randomness, and (iv) domain radial position.

11. The method of claim 1, wherein the domains are protein domains.

12. A method for quantifying domains within a punctate distribution comprising the steps of:
    acquiring at least one digital image of a punctate distribution, wherein the at least one digital image is a fluorescence photomicrographic image of the nucleus of a eukaryotic cell;
    performing image segmentation on the at least one digital image to produce a segmented image of the punctate distribution;
    identifying protein domains within the punctate distribution in the segmented image;
    computing organizational parameters of the protein domains within the punctate distribution of the segmented image; and
    performing statistical analysis of the organizational parameters wherein the organizational parameters comprise the number of domains, mean domain size, median domain size, standard deviation of domain size, variance of domain size, skewness of domain size, kurtosis of domain size, coefficient of variation of domain size; index of dispersion of domain size; mean nearest neighbor distance, median nearest neighbor distance, standard deviation of nearest neighbor distance, variance of nearest neighbor distance, skewness of nearest neighbor distance, kurtosis of nearest neighbor distance, coefficient of variation of nearest neighbor distance; index of dispersion of nearest neighbor distance, domain density, Re, Ro/Re, Ve, Vo/Ve, Rp, Rd, or Rd/Rp.

13. The method of claim 12, wherein the step of acquiring digital images further comprises the step of deconvoluting the digital image.

14. The method of claim 12, wherein the step of identifying domains further comprises the step of providing a mask of a portion of the digital image.

15. The method of claim 12, wherein the step of identifying domains further comprises the step of producing a masked image.

16. The method of claim 12, wherein the step of performing image_segmentation further comprises the step of determining an image threshold.

17. The method of claim 12, wherein the step of performing image segmentation further comprises the step of selecting a threshold that maximizes the number of detectable domains in the segmented image.

18. The method of claim 12, further comprising the step of performing factor analysis on the organizational parameters.

19. A method for quantifying the organization of molecules in a cell, comprising:
    acquiring a digital image that comprises fluorescently labeled molecules in a cell, wherein the digital image is a fluorescence photomicrographic image;
    segmenting the at least one digital image to produce a segmented image;
    detecting, in the segmented image, domains of the molecules in the cell;
    determining the number of domains in the cell;
    determining the areas of the domains and the centroids of the domains;
    determining the locations of the centroids of the domains in pixel coordinates of the segmented image wherein the at least 25 organizational parameters comprise the number of domains, mean domain size, median domain size, standard deviation of domain size, variance of domain size, skewness of domain size, kurtosis of domain size, coefficient of variation of domain size; index of dispersion of domain size; mean nearest neighbor distance, median nearest neighbor distance, standard deviation of nearest neighbor distance, variance of nearest neighbor distance, skewness of nearest neighbor distance, kurtosis of nearest neighbor distance, coefficient of variation of nearest neighbor distance; index of dispersion of nearest neighbor distance, domain density, Re, Ro/Re, Ve, Vo/Ve, Rp, Rd, or Rd/Rp; and
    computing at least twenty-five parameters that quantify the organization of the molecule in the cell based, in part, on the areas and the locations of the centroids of the domains.

20. The method of claim 19, wherein the at least 25 parameters are selected from parameters that describe (i) domain quantity and nuclear size, (ii) domain size and variability, (iii) domain spatial randomness, and (iv) domain radial position.

21. The method of claim 19, wherein the molecule is a protein.

22. The method of claim 19, further comprising producing a nuclear mask image and determining the area of the nucleus of the cell in the nuclear mask image, wherein the parameters are based, in further part, on the area of the nucleus.

23. The method of claim 19, further comprising performing factor analysis on the parameters.

* * * * *

UNITED STATES PATENT AND TRADEMARK OFFICE
CERTIFICATE OF CORRECTION

| | |
|---|---|
| PATENT NO. | : 7,813,881 B2 |
| APPLICATION NO. | : 11/221166 |
| DATED | : October 12, 2010 |
| INVENTOR(S) | : Gary S. Stein et al. |

It is certified that error appears in the above-identified patent and that said Letters Patent is hereby corrected as shown below:

In Claim 19, at column 30, line 27, "determining the locations of the centroids of the domains in pixel coordinates of the segmented image;
wherein the at least 25 organizational parameters comprise the number of domains, mean domain size, median domain size, standard deviation of domain size, variance of domain size, skewness of domain size, kurtosis of domain size, coefficient of variation of domain size; index of dispersion of domain size; mean nearest neighbor distance, median nearest neighbor distance, standard deviation of nearest neighbor distance, variance of nearest neighbor distance, skewness of nearest neighbor distance, kurtosis of nearest neighbor distance, coefficient of variation of nearest neighbor distance; index of dispersion of nearest neighbor distance, domain density, Re, Ro/Re, Ve, Vo/Ve, Rp, Rd, or Rd/Rp; and
computing at least twenty-five parameters that quantify the organization of the molecule in the cell based, in part, on the areas and the locations of the centroids of the domains."

should read

--determining the locations of the centroids of the domains in pixel coordinates of the segmented image; and
computing at least twenty-five parameters that quantify the organization of the molecule in the cell based, in part, on the areas and the locations of the centroids of the domains, wherein the at least 25 organizational parameters comprise the number of domains, mean domain size, median domain size, standard deviation of domain size, variance of domain size, skewness of domain size, kurtosis of domain size, coefficient of variation of domain size, index of dispersion of domain size, mean nearest neighbor distance, median nearest neighbor distance, standard deviation of nearest neighbor distance, variance of nearest neighbor distance, skewness of nearest neighbor distance, kurtosis of nearest neighbor distance, coefficient of variation of nearest neighbor distance, index of dispersion of nearest neighbor distance, domain density, Re, Ro/Re, Ve, Vo/Ve, Rp, Rd, or Rd/Rp.--

Signed and Sealed this
Fourth Day of January, 2011

David J. Kappos
*Director of the United States Patent and Trademark Office*